United States Patent
Jung et al.

(10) Patent No.: US 10,560,565 B2
(45) Date of Patent: Feb. 11, 2020

(54) ELECTRONIC DEVICE AND OPERATING METHOD THEREOF

(71) Applicant: Samsung Electronics Co., Ltd., Gyeonggi-do (KR)

(72) Inventors: Junwon Jung, Seoul (KR); Jeong-Won Ko, Seoul (KR); Joong-Hun Kwon, Seoul (KR); Chang-Hwan Kim, Seoul (KR); Sangdeuk Nam, Gyeonggi-do (KR); Seung Wook Nam, Gyeonggi-do (KR); Myoung-Soo Park, Gyeonggi-do (KR); Sunyoung Park, Seoul (KR); Kyungjun Lee, Gyeonggi-do (KR); Dong Oh Lee, Gyeonggi-do (KR); Huichul Yang, Gyeonggi-do (KR); Hyunyeul Lee, Seoul (KR); Soojin Jeong Lim, Gyeonggi-do (KR); Joonhwan Kim, Gyeonggi-do (KR); Hyungsok Yeo, Gyeonggi-do (KR); Jae-Min Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/897,562

(22) Filed: Feb. 15, 2018

(65) Prior Publication Data
US 2018/0234538 A1     Aug. 16, 2018

(30) Foreign Application Priority Data
Feb. 15, 2017   (KR) .................. 10-2017-0020580

(51) Int. Cl.
*H04M 1/725*     (2006.01)
*H04W 4/02*      (2018.01)
*G06K 9/00*      (2006.01)

(52) U.S. Cl.
CPC .... *H04M 1/72569* (2013.01); *G06K 9/00248* (2013.01); *H04M 1/72597* (2013.01); *H04W 4/026* (2013.01)

(58) Field of Classification Search
CPC ......... H04M 1/72569; H04M 1/72597; H04W 4/026
See application file for complete search history.

(56) References Cited

U.S. PATENT DOCUMENTS

| | | | |
|---|---|---|---|
| 8,243,961 B1 | 8/2012 | Morrill | |
| 8,588,434 B1 | 11/2013 | Morrill | |
| 8,593,558 B2 * | 11/2013 | Gardiner | G06F 1/1626 348/333.12 |
| 8,896,533 B2 * | 11/2014 | Sonoda | G06F 3/0346 345/158 |
| 2007/0004451 A1 * | 1/2007 | C. Anderson | G06F 1/1626 455/556.1 |
| 2010/0201712 A1 * | 8/2010 | Grignani | G06F 1/1626 345/660 |
| 2012/0223884 A1 * | 9/2012 | Bi | G06F 1/1694 345/158 |

(Continued)

*Primary Examiner* — Nguyen T Vo
(74) *Attorney, Agent, or Firm* — The Farrell Law Firm, P.C.

(57) ABSTRACT

Disclosed is an operating method of an electronic device. The operating method includes acquiring phase information of the electronic device while a first application is executed; determining whether the electronic device is rotated based on the phase information; and executing a second application when the electronic device is rotated.

14 Claims, 21 Drawing Sheets

(56) References Cited

U.S. PATENT DOCUMENTS

| | | | | |
|---|---|---|---|---|
| 2013/0009867 | A1* | 1/2013 | Woo | G09G 5/00 |
| | | | | 345/156 |
| 2014/0267006 | A1* | 9/2014 | Raffa | G06F 1/1626 |
| | | | | 345/156 |
| 2014/0370937 | A1* | 12/2014 | Park | H04M 1/72519 |
| | | | | 455/566 |
| 2015/0227297 | A1* | 8/2015 | Kim | G06F 3/04845 |
| | | | | 715/799 |
| 2018/0096460 | A1* | 4/2018 | Tripp | G06F 1/1684 |
| 2018/0136947 | A1* | 5/2018 | Choi | G06F 9/451 |
| 2018/0318706 | A1* | 11/2018 | Nishimaki | G06F 3/01 |

* cited by examiner

ELECTRONIC DEVICE AND OPERATING METHOD THEREOF

CROSS-REFERENCE TO RELATED APPLICATION(S)

This application is based on and claims priority under 35 U.S.C. § 119 to Korean Patent Application No. 10-2017-0020580, filed on Feb. 15, 2017, in the Korean Intellectual Property Office, the disclosure of which is incorporated by reference herein in its entirety.

BACKGROUND

1. Field

The present disclosure relates generally to an electronic device and an operating method thereof.

2. Description of the Related Art

With the advancement of information communication technology and semiconductor technology, an electronic device is evolving into a multimedia device that provides various multimedia services. For example, an electronic device can provide services such as a broadcast service, a wireless Internet service, a music service, etc.

An electronic device can provide various multimedia services, and thus needs to display an ever increasing amount of data. As a result, there is a growing interest in an electronic device employing a touch screen with an increased screen size.

An electronic device may display a soft key, which performs the function of a hard key, instead of a physical hard key on a touch screen thereof. However, the electronic device displays a soft key at a fixed location on the touch screen thereof without regard to a phase change (e.g., rotation) thereof. Accordingly, when the phase of the electronic device is changed (e.g., rotated upside down), a user of the electronic device needs to find the changed location of the soft key which has changed relative to the user's perspective, and thus may feel inconvenience in using the electronic device.

Also, the electronic device receives a separate key input from the user in order to execute or switch an application, and thus, the user of the electronic device needs to input a key multiple times in order to execute or switch an application, which is inconvenient for the user.

SUMMARY

An aspect of the present disclosure is to provide a method and an apparatus for, when the phase of an electronic device changes, changing the display location of a soft key in view of phase information of the electronic device.

Another aspect of the present disclosure is to provide a method and an apparatus for, when the phase of an electronic device changes, executing a determined application in view of phase information of the electronic device.

Another aspect of the present disclosure is to provide a method and an apparatus for, when the phase of an electronic device changes, providing a soft key performing the function of a physical hard key in view of phase information of the electronic device.

In accordance with an aspect of the present disclosure, an operating method of an electronic device includes acquiring phase information of the electronic device while a first application is executed; determining whether the electronic device is rotated based on the phase information; and executing a second application when the electronic device is rotated.

In accordance with an aspect of the present disclosure, an electronic device includes a sensor module configured to acquire phase information of the electronic device; and a processor configured to acquire the phase information of the electronic device through the sensor module while a first application is executed, determine whether the electronic device is rotated based on the phase information, and execute a second application when the electronic device is rotated.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
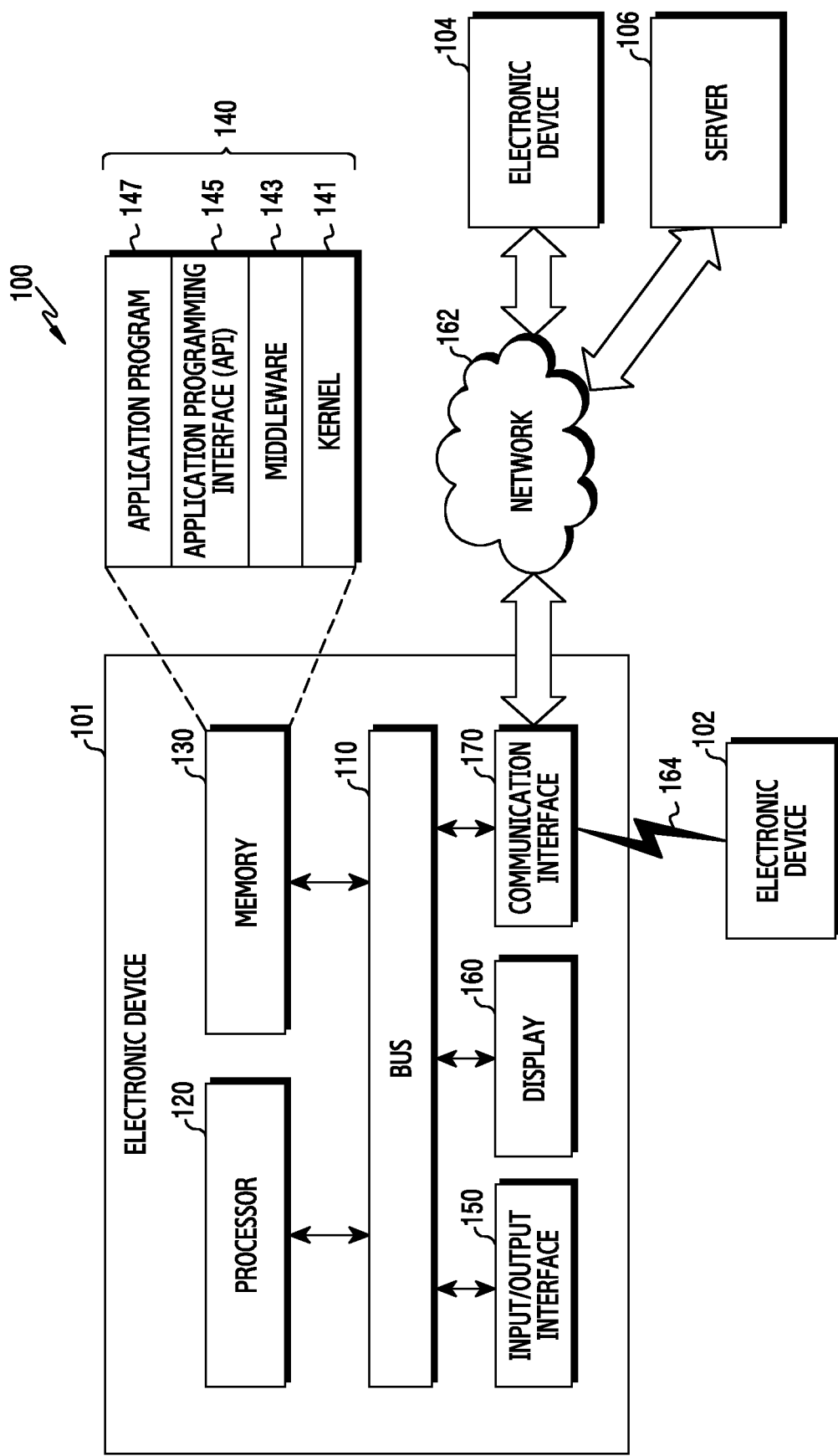
FIG. 1 is a view illustrating an electronic device within a network environment, according to various embodiments of the present disclosure.

Hereinafter, various embodiments of the present disclosure will be described with reference to the accompanying drawings. It should be understood that the embodiments of the present disclosure and the terms used herein do not limit the present disclosure to the particular forms disclosed, and the present disclosure covers various modifications, equivalents, and/or alternatives of the corresponding embodiments. In describing the drawings, similar reference numerals may be used to designate similar elements.

As used herein, the singular forms may include the plural forms as well, unless the context clearly indicates otherwise. In the present disclosure, the expressions "A or B" or "at least one of A and/or B" may include all possible combinations of the items listed. The expressions "a first", "a second", "the first", or "the second" may modify corresponding elements regardless of the order or the importance thereof, and is used only to distinguish one element from another element, but do not limit the corresponding elements. When an element (e.g., a first element) is referred to as being "(operatively or communicatively) coupled with/to" or "connected to" another element (e.g., a second element), the element may be directly coupled with/to or connected to the other element or an intervening element (e.g., a third element) may be present.

In the present disclosure, the expression "configured to" may be used interchangeably with the expressions "suitable for", "having the capacity to", "adapted to", "made to", "capable of", or "designed to" in terms of hardware or software, according to the circumstances. In some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a general-purpose processor (e.g., central processing unit (CPU) or application processor (AP)) that can perform the corresponding operations by executing one or more software programs stored in a memory device.

An electronic device according to various embodiments of the present disclosure, may include a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), an motion picture experts group (MPEG-1 or MPEG-2) audio layer-3 (MP3) player, a medical device, a camera, and a wearable device. The wearable device may include an accessory type (e.g., a watch, a ring, a bracelet, an anklet, a necklace, glasses, a contact lens, or a head-mounted device (HMD)), a fabric- or clothing-integrated type (e.g., an electronic clothing), a body-mounted type (e.g., a skin pad or tattoo), and a bio-implantable type (e.g., an implantable circuit). The electronic device may include a television (TV), a digital versatile disk (DVD) player, an audio player, a refrigerator, an air conditioner, a vacuum cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™ and PlayStation™), an electronic dictionary, an electronic key, a camcorder, and an electronic photo frame.

According to an embodiment of the present disclosure, the electronic device may include various medical devices (e.g., portable medical measuring devices (e.g., a blood glucose monitoring device, a heart rate monitoring device, a blood pressure measuring device, a body temperature measuring device, etc.), a magnetic resonance angiography (MRA) device, a magnetic resonance imaging (MRI) device, a computed tomography (CT) machine, and an ultrasonic machine), a navigation device, a global navigation satellite system (GNSS), an event data recorder (EDR), a flight data recorder (FDR), a vehicle infotainment device, electronic devices for a ship (e.g., a navigation device, a gyro-compass, etc.), avionics, security devices, an automotive head unit, a robot for home or industry, a drone, an automated teller machine (ATM), a point of sales (POS) device, and an Internet of things (IoT) device (e.g., a light bulb, various sensors, a sprinkler device, a fire alarm, a thermostat, a streetlamp, a toaster, sporting goods, a hot water tank, a heater, a boiler, etc.).

According to various embodiments of the present disclosure, the electronic device may include at least one of a part of a piece of furniture, a building/structure, a motor vehicle, an electronic board, an electronic signature receiving device, a projector, and various kinds of measurement instruments (e.g., a water meter, an electric meter, a gas meter, and a radio wave meter). The electronic device may be flexible, or may be a combination of two or more of the aforementioned devices. The electronic device is not limited to the aforementioned devices, and may include a new electronic device depending on technical progress.

In the present disclosure, the term "user" may indicate a person using an electronic device or a device (e.g. an artificial intelligence (AI) electronic device) using an electronic device.

FIG. 1 illustrates a network environment 100 including an electronic device, according to various embodiments of the present disclosure.

Referring to FIG. 1, the electronic device 101 may include a bus 110, a processor 120, a memory 130, an input/output interface 150, a display 160, and a communication interface 170. According to various embodiments of the present disclosure, at least one of the above elements of the electronic device 101 may be omitted from the electronic device 101, or the electronic device 101 may additionally include other elements.

The bus 110 may include a circuit that interconnects the elements 120 to 170 and delivers a communication (e.g., a control message or data) between the elements 120 to 170.

The processor 120 may include one or more of a CPU, an AP, and a communication processor (CP). The processor 120 may perform calculations or data processing related to control over and/or communication by at least one of the other elements of the electronic device 101.

According to an embodiment of the present disclosure, the processor 120 may determine whether the electronic device 101 has been rotated, based on phase information of the electronic device 101. While the display 160 is activated, the processor 120 may acquire phase information of the electronic device 101 through a sensor module (e.g., a gyro sensor, an acceleration sensor, a gravity sensor, a camera module, etc.) for measuring the phase of the electronic device 101. The processor 120 may check the rotation angle of the electronic device 101 based on the phase information of the electronic device 101. When the rotation angle of the electronic device 101 falls within a reference angle range (e.g., 170 to 190 degrees), the processor 120 may determine that the electronic device 101 has been rotated. In order to determine whether the electronic device 101 has been rotated, the processor 120 may consider not only the rotation angle of the electronic device 101 but also face information of a user of the electronic device 101. For example, when the rotation angle of the electronic device 101 falls within the reference angle range, the processor 120 may recognize the user's face by using a camera module. The processor 120 may determine whether the electronic device 101 has been rotated, based on the locations of the user's eyes, nose, mouth, chin, etc. When the eyes are located at a position lower than the position of the nose, mouth, or chin, the processor 120 may determine that the electronic device 101 has been rotated. The reference angle range may be changed by the user so as to have another value.

According to an embodiment of the present disclosure, when the electronic device 101 has been rotated, the processor 120 may control the display 160 to display a soft key and a notification bar such that locations of the soft key and notification bar displayed on the display 160 are changed. For example, when the electronic device 101 has been rotated by an angle of 180 degrees and is turned upside down, the processor 120 may control the display 160 such that a soft key displayed on a lower end part of the display 160 is displayed on an upper end part thereof and a notification bar displayed on an upper end part of the display 160 is displayed on a lower end part thereof. The soft key may perform functions of a menu key, a home key, a back key, etc.

According to an embodiment of the present disclosure, when the electronic device 101 is rotated while a first application is executed, the processor 120 may execute a configured second application. For example, when the electronic device 101 is rotated while a social application is executed, the processor 120 may check the rotation direction of the electronic device 101 based on phase information of the electronic device 101. The processor 120 may load, from the memory 130, a list of applications configured according to the respective rotation directions of the electronic device 101, and then may check an application corresponding to the rotation direction of the electronic device 101. When an application corresponding to the rotation direction of the electronic device 101 is a music application, the processor 120 may execute the music application. When the electronic device 101 is rotated while a social application is executed, the processor 120 may check an application executed by the electronic device 101 before the execution of the social application. When an application executed before the execution of the social application is a camera application, the processor 120 may execute the camera application.

According to an embodiment of the present disclosure, when the configured second application is executed according to the rotation of the electronic device 101 while the first application is executed, the processor 120 may control the display 160 such that a screen corresponding to the first application is switched to a screen corresponding to the second application and such that the screen corresponding to the second application is displayed.

According to an embodiment of the present disclosure, when the configured second application is executed according to the rotation of the electronic device 101 while the first application is executed, the processor 120 may control the display 160 such that a screen corresponding to the first application and a screen corresponding to the second application are displayed in a multi-window format. The processor 120 may control the display 160 such that a keypad is displayed at a lower part of an application allowing a text input among the first and second applications. When both the first and second applications are applications allowing a text input, the processor 120 may control the display 160 such that a keypad is displayed at a lower part of the second application.

According to an embodiment of the present disclosure, when an unidentified notification exists while the first application is executed, if the electronic device 101 is rotated, the processor 120 may execute an application corresponding to the unidentified notification instead of the configured second application. For example, when a text message is received while a social application is executed, the processor 120 may control the display 160 to display notification information of the reception of the text message. When the electronic device 101 is rotated in a state where the notification information is displayed, the processor 120 may execute a message application.

According to an embodiment of the present disclosure, when the electronic device 101 is rotated, the processor 120 may generate a soft key corresponding to a physical hard key. When the electronic device 101 is rotated, the processor 120 may control the display 160 to display a soft key corresponding to a physical hard key of the electronic device 101. The processor 120 may determine a location at which the soft key is to be displayed, based on the direction of a user's hand that is gripping the electronic device 101. For example, when the electronic device 101 is rotated in a state where the user grips the electronic device 101 in his/her right hand, the processor 120 may determine a location, which corresponds to a range allowing the thumb of the user's right hand to perform an input, as a location at which a soft key is to be displayed. The soft key may perform functions of a volume key, a lock key (or a power key), etc. The direction of the user's hand that is gripping the electronic device 101 may be checked based on sensing information detected by a pressure sensor included in the electronic device 101.

The memory 130 may include a volatile memory and/or a non-volatile memory. The memory 130 may store commands or data related to at least one of the other elements of the electronic device 101. According to an embodiment of the present disclosure, the memory 130 may store software and/or a program 140. The program 140 may include a kernel 141, middleware 143, an application programming interface (API) 145, and/or an application 147. At least some of the kernel 141, the middleware 143, and the API 145 may be referred to as an operating system (OS). The kernel 141 may control or manage system resources (e.g., the bus 110, the processor 120, the memory 130, etc.) used to execute operations or functions implemented by the other programs (e.g., the middleware 143, the API 145, and the application 147). Also, the kernel 141 may provide an interface capable of controlling or managing the system resources by accessing the individual elements of the electronic device 101 by using the middleware 143, the API 145, or the application 147.

The middleware 143 may serve as an intermediary that enables the API 145 or the application 147 to communicate with the kernel 141 and to exchange data therewith. Also, the middleware 143 may process one or more task requests received from the application 147 according to a priority. The middleware 143 may assign a priority, which enables the use of system resources (e.g., the bus 110, the processor 120, the memory 130, etc.) of the electronic device 101, to at least one of the applications 147, and may process the one or more task requests according to the assigned priority. The API 145 is an interface through which the application 147 controls a function provided by the kernel 141 or the middleware 143, and may include at least one interface or function (e.g., instruction) for file control, window control, image processing, character control, etc.

The input/output interface 150 may deliver a command or data, which is input from a user or an external device, to the element(s) other than the input/output interface 150 within the electronic device 101, or may output, to the user or an external device, commands, or data received from the element(s) other than the input/output interface 150 within the electronic device 101.

The display 160 may include a liquid crystal display (LCD), a light-emitting diode (LED) display, an organic light-emitting diode (OLED) display, a micro electro mechanical systems (MEMS) display, and an electronic paper display. The display 160 may display various pieces of content (e.g., text, images, videos, icons, symbols, etc.) to the user. The display 160 may include a touch screen, and may receive a touch input, a gesture input, a proximity input, or a hovering input provided by an electronic pen or a body part of the user.

The communication interface 170 may establish communication between the electronic device 101 and an external device (e.g., a first external electronic device 102, a second external electronic device 104, or a server 106). The communication interface 170 may be connected to a network 162 through wireless or wired communication, and may communicate with the external device.

The types of wireless communication may include, for example, cellular communication which uses long-term evolution (LTE), LTE-advanced (LTE-A), code division multiple access (CDMA), wideband CDMA (WCDMA), universal mobile telecommunications system (UMTS), WiBro (Wireless Broadband), and global system for mobile communications (GSM). According to an embodiment of the present disclosure, the types of wireless communication 164 may include wireless fidelity (Wi-Fi), light fidelity (Li-Fi), Bluetooth™, Bluetooth low energy (BLE), ZigBee, near field communication (NFC), magnetic secure transmission (MST), radio frequency (RF), and body area network (BAN). The types of wireless communication may include a GNSS. The GNSS may be a global positioning system (GPS), a global navigation satellite system (GLONASS), a Beidou navigation satellite system (Beidou), or the European global satellite-based navigation system (Galileo). Hereinafter, in the present disclosure, the term "GPS" may be used interchangeably with the term "GNSS."

The types of wired communication may include a universal serial bus (USB), a high definition multimedia interface (HDMI), recommended standard 232 (RS-232), power line communication (PLC), and a plain old telephone service (POTS). The network 162 may include telecommunication networks, such as a computer network (e.g., a local area network (LAN) or a wide area network (WAN)), the Internet, and a telephone network.

Each of the first and second external electronic devices 102 and 104 may be of a type identical to or different from that of the electronic device 101. According to various embodiments of the present disclosure, all or some of operations performed by the electronic device 101 may be performed by another electronic device or multiple electronic devices (e.g., the first and second external electronic devices 102 and 104, or the server 106). When the electronic device 101 needs to perform some functions or services automatically or by a request, the electronic device 101 may send, to another device, a request for performing at least some functions related to the functions or services, instead of performing the functions or services by itself, or additionally. Another electronic device may execute the requested functions or the additional functions, and may deliver a result of the execution to the electronic device 101. The electronic device 101 may process the received result without any change or additionally, and may provide the requested functions or services. To this end, cloud computing technology, distributed computing technology, or client-server computing technology.

According to various embodiments of the present disclosure, the electronic device 101 may further include a sensor module for acquiring phase information of the electronic device 101. The sensor module may include a gyro sensor, an acceleration sensor, a gravity sensor, and a camera module.

According to various embodiments of the present disclosure, the electronic device 101 may further include a pressure sensor for acquiring user grip information. The processor 120 may check the direction of a user's hand that is gripping the electronic device 101, based on sensing information detected by the pressure sensor, and then may control the display 160 to display a soft key corresponding to a hard key in view of the direction of the user's hand that is gripping the electronic device 101.

Figure 2:
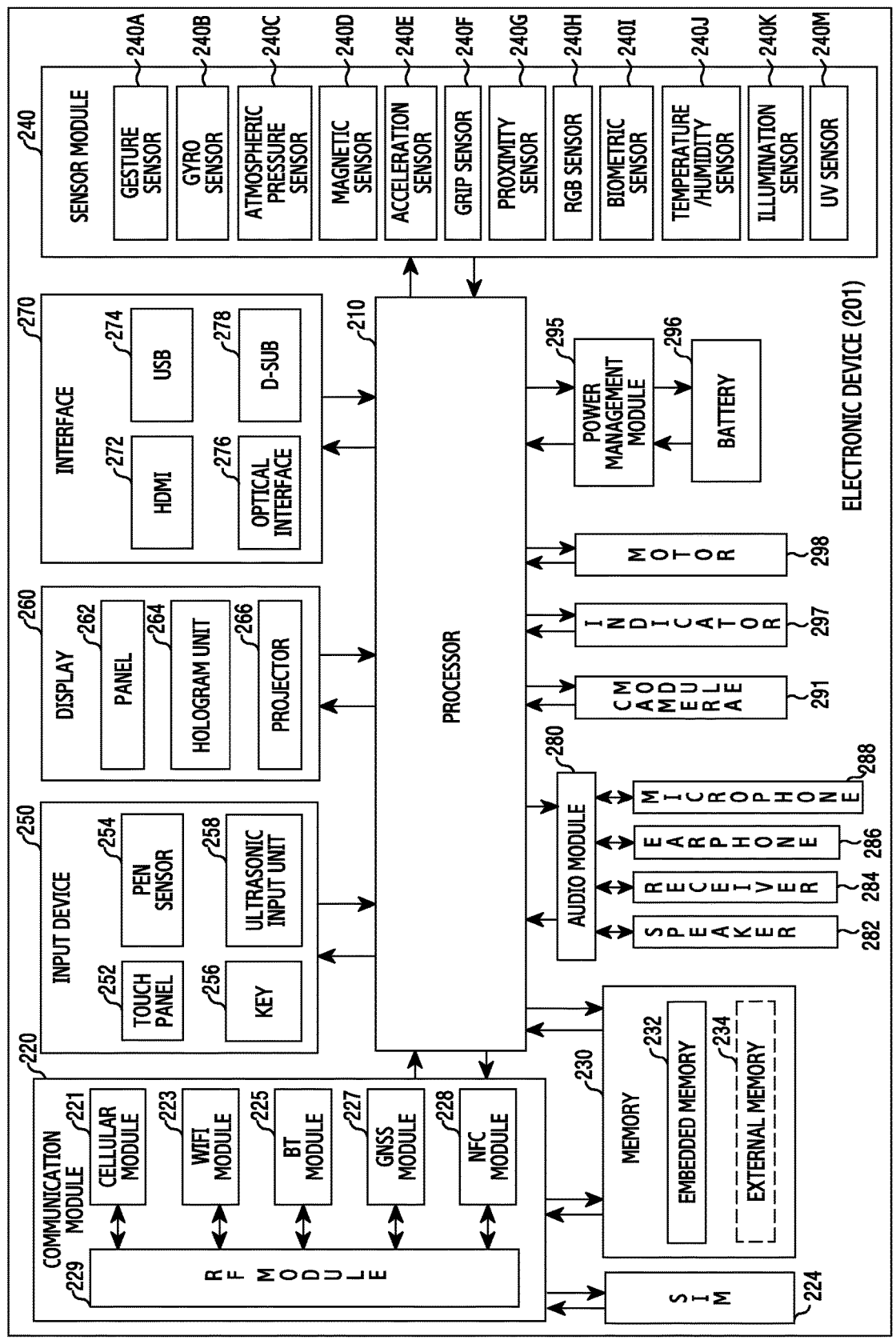
FIG. 2 is a block diagram illustrating a configuration of an electronic device, according to various embodiments of the present disclosure.

FIG. 2 is a block diagram illustrating a configuration of an electronic device, according to various embodiments of the present disclosure.

According to various embodiments of the present disclosure, electronic device 201 may include all or a part of the electronic device 101.

Referring to FIG. 2, the electronic device 201 may include one or more processors 210 (e.g., an AP), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an OS or an application program, and perform processing of various pieces of data and calculations. The processor 210 may be implemented as, for example, a system on chip (SoC). According to an embodiment of the present disclosure, the processor 210 may further include a graphic processing unit (GPU) and/or an image signal processor (ISP). The processor 210 may include a part (e.g., a cellular module 221) of the components of electronic device 201. The processor 210 may load, into a volatile memory, commands or data received from at least one (e.g., a non-volatile memory) of the other components and may process the loaded commands or data, and may store a variety of data in a non-volatile memory.

According to various embodiments of the present disclosure, the communication module 220 may, have a configuration equivalent or similar to that of the communication interface 170. The communication module 220 may include a cellular module 221, a Wi-Fi module 223, a Bluetooth (BT) module 225, a GNSS module 227 (e.g., a GPS module, a Glonass module, a Beidou module, or a Galileo module), an NFC module 228, and a RF module 229.

The cellular module 221 may provide a voice call, a video call, a text message service, or an Internet service through a communication network. According to various embodiments of the present disclosure, the cellular module 221 may distinguish and authenticate the electronic device 201 in a communication network using the SIM 224 (e.g., the SIM card). The cellular module 221 may perform at least some of the functions that the processor 210 may provide. The cellular module 221 may include a CP.

According to various embodiments of the present disclosure, each of the Wi-Fi module 223, the BT module 225, the GNSS module 227, and the NFC module 228 may include a processor for processing data transmitted/received through a corresponding module. At least some (e.g., two or more) of the cellular module 221, the Wi-Fi module 223, the BT module 225, the GNSS module 227, and the NFC module 228 may be included in one integrated circuit (IC) chip or IC package.

The RF module 229 may transmit or receive a communication signal (e.g., an RF signal). The RF module 229 may include a transceiver, a power amplifier module (PAM), a frequency filter, a low noise amplifier (LNA), and an antenna. According to various embodiments of the present disclosure, one of the cellular module 221, the WI-FI module 223, the BT module 225, the GNSS module 227, and the NFC module 228 may transmit/receive an RF signal through a separate RF module.

According to various embodiments of the present disclosure, SIM 224 may include a card including a SIM and/or an embedded SIM, and may contain unique identification information (e.g., an integrated circuit card identifier (ICCID)) or subscriber information (e.g., an international mobile subscriber identity (IMSI)).

The memory 230 may include an embedded memory 232 or an external memory 234. The embedded memory 232 may include a volatile memory (e.g., a dynamic random access memory (DRAM), a static RAM (SRAM), a synchronous dynamic RAM (SDRAM), etc.) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, a solid state drive (SSD), etc.).

The external memory 234 may further include a flash drive such as a compact flash (CF), a secure digital (SD), a micro secure digital (Micro-SD), a mini secure digital (mini-SD), an eXtreme Digital (xD), a multi-media card (MMC), a memory stick, etc. The external memory 234 may be functionally and/or physically connected to the electronic device 201 through various interfaces.

According to various embodiments of the present disclosure, sensor module 240 may measure a physical quantity or detect an operation state of the electronic device 201, and may convert the measured or detected information into an electrical signal. The sensor module 240 may include a gesture sensor 240A, a gyro sensor 240B, an atmospheric pressure sensor (barometer) 240C, a magnetic sensor 240D, an acceleration sensor 240E, a grip sensor 240F, a proximity sensor 240B a color sensor 240H (e.g., red, green, and blue (RGB) sensor), a biometric sensor 240I (e.g., medical sensor), a temperature/humidity sensor 240J, an illuminance sensor 240K, and a ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 240 may further include a control circuit for controlling one or more sensors included therein. The electronic device 201 may further include a processor configured to control the sensor module 240, as a part of the processor 210 or separately from the processor 210, and may control the sensor module 240 while the processor 210 is in a sleep state.

The input device 250 may include a touch panel 252, a (digital) pen sensor 254, a key 256, or an ultrasonic input device 258. The touch panel 252 may use one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include a recognition sheet which is a part of the touch panel or is separated from the touch panel. The key 256 may include a physical button, an optical key, or a keypad. The ultrasonic input device 258 may detect, through a microphone 288, ultrasonic waves generated by an input tool, and identify data corresponding to the detected ultrasonic waves.

The display 260 may include a panel 262, a hologram device 264, or a projector 266. The panel 262 may include a configuration identical or similar to the display 160. The panel 262 may be implemented to be flexible, transparent, or wearable. The panel 262 may be integrated as a single module with the touch panel 252. The hologram device 264 may show a three dimensional (3D) image in the air by using an interference of light. The projector 266 may project light onto a screen to display an image. The screen may be located in the interior of or on the exterior of the electronic device 201. According to an embodiment of the present disclosure, the display 260 may further include a control circuit for controlling the panel 262, the hologram device 264, or the projector 266.

The interface 270 may include a high-definition multimedia interface (HDMI) 272, a USB 274, an optical interface 276, or a D-subminiature (D-sub) 278. The interface 270 may be included in the communication interface 170. Additionally or alternatively, the interface 270 may include a mobile high-definition link (MHL) interface, a SD card/ MMC interface, or an Infrared Data Association (IrDA) standard interface.

The audio module 280 may convert a sound to an electrical signal and vice versa. At least some components of the audio module 280 may be included in the input/output interface 150. The audio module 280 may process voice information input or output through a speaker 282, a receiver 284, earphones 286, or the microphone 288.

The camera module 291 is a device which may photograph a still image and a video. According to various embodiments of the present disclosure, the camera module 291 may include one or more image sensors (e.g., a front sensor or a back sensor), a lens, an ISP or a flash (e.g., LED or xenon lamp).

The power management module 295 may manage power of the electronic device 201. According to an embodiment of the present disclosure, the power management module 295 may include a power management integrated circuit (PMIC), a charger IC, or a battery gauge. The PMIC may use a wired and/or wireless charging method. The wireless charging method may include a magnetic resonance method, a magnetic induction method, an electromagnetic wave method, etc. Additional circuits (e.g., a coil loop, a resonance circuit, a rectifier, etc.) for wireless charging may be further included. The battery gauge may measure a residual quantity of the battery 296, and a voltage, a current, or a temperature while charging. The battery 296 may include a rechargeable battery and/or a solar battery.

The indicator 297 may display a particular state (e.g., a booting state, a message state, a charging state, etc.) of the electronic device 201 or a part (e.g., the processor 210) of the electronic device 201. The motor 298 may convert an electrical signal into a mechanical vibration, and may generate a vibration, a haptic effect, etc. The electronic device 201 may include a processing device (e.g., a GPU) for supporting a mobile TV. The processing device for supporting a mobile TV may process media data according to a certain standard such as digital multimedia broadcasting (DMB), digital video broadcasting (DVB), or mediaFLO™.

According to an embodiment of the present disclosure, each of the above-described component elements of hardware may be configured with one or more components, and the names of the corresponding component elements may vary based on the type of electronic device. The electronic device may include at least one of the above-described elements. Some of the above-described elements may be omitted from the electronic device, or the electronic device may further include additional elements. Also, some of the hardware components may be combined into one entity, which may perform functions identical to those of the relevant components before the combination.

Figure 3:
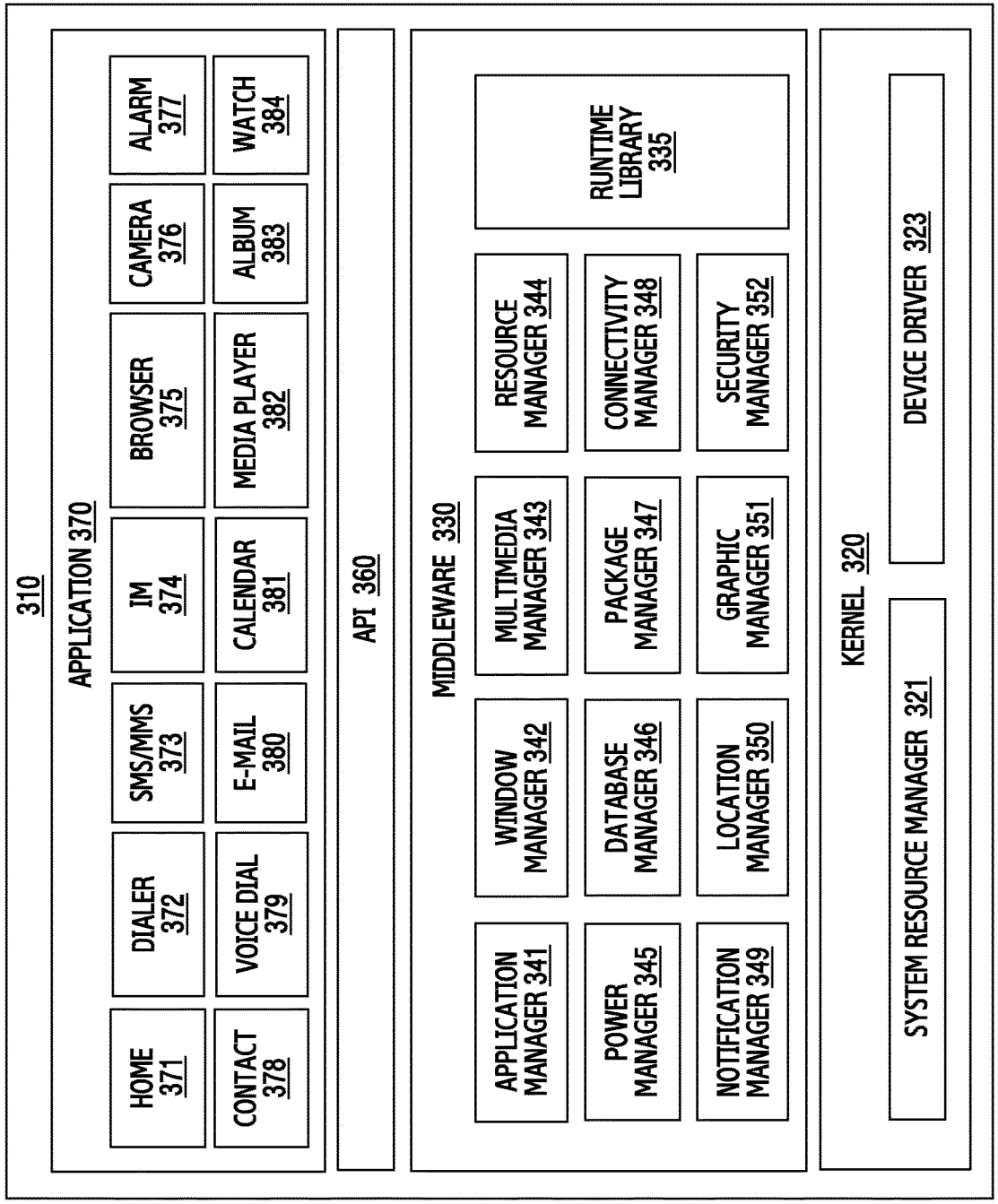
FIG. 3 is a block diagram illustrating a configuration of a program module, according to various embodiments of the present disclosure.

FIG. 3 is a block diagram illustrating a configuration of a program module, according to various embodiments of the present disclosure;

According to an embodiment of the present disclosure, the program module 310 may include an OS for controlling resources related to the electronic device 101 and/or applications 147 executed in the OS. The OS may comprise Android, iOS™ Windows™, Symbian™, Tizen™, Bada™, etc.

Referring to FIG. 3, the program module 310 may include a kernel 320, middleware 330, an API 360, and/or applications 370. According to various embodiments of the present disclosure, at least some of the program module 310 may be preloaded on an electronic device, or may be downloaded from an external electronic device (e.g., the electronic device 102 or 104, or the server 106).

The kernel 320 may include a system resource manager 321 and/or a device driver 323. The system resource manager 321 may control, allocate, or collect system resources. According to various embodiments of the present disclosure, the system resource manager 321 may include a process management unit, a memory management unit, a file system management unit, etc. The device driver 323 may include a display driver, a camera driver, a Bluetooth™ driver, a shared memory driver, a USB driver, a keypad driver, a Wi-Fi driver, an audio driver, or an inter-process communication (IPC) driver.

The middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 may include a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

According to various embodiments of the present disclosure, runtime library 335 may include a library module which a compiler uses in order to add a new function through a programming language while an application 370 is being executed. The runtime library 335 may perform input/output management, memory management, the functionality for an arithmetic function, etc.

According to various embodiments of the present disclosure, the application manager 341 may manage, a life cycle of the applications 370. The window manager 342 may manage the graphical user interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

According to various embodiments of the present disclosure, power manager 345 may operate together with a basic input/output system (BIOS) or the like to manage a battery or power source, and may provide power information or the like required for the operations of the electronic device. The database manager 346 may generate, search for, and/or change a database to be used by at least one of the applications 370. The package manager 347 may manage installation or an update of an application distributed in a form of a package file.

The connectivity manager 348 may manage wireless connectivity such as Wi-Fi or Bluetooth. The notification manager 349 may display or notify of an event such as an arrival message, promise, proximity notification, etc. in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, etc. According to an embodiment of the present disclosure, when the electronic device 101 provides a telephone call function, the middleware 330 may further include a telephony manager for managing a voice call function or a video call function of the electronic device.

According to various embodiments of the present disclosure, middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 includes a set of API programming functions, and may be provided with a different configuration according to an OS. In the case of Android or iOS, one API set may be provided for each platform. In the case of Tizen, two or more API sets may be provided for each platform.

The applications 370 may include one or more applications which provide functions such as a home 371 application, a dialer 372 application, an SMS/MMS 373 application, an instant message (IM) 374 application, a browser 375 application, a camera 376 application, an alarm 377 application, a contacts 378 application, a voice dial 379 application, an email 380 application, a calendar 381 application, a media player 382 application, an album 383 application, a watch 384 application, a healthcare application (e.g., measuring exercise quantity or blood sugar level), or an environment information application (e.g., providing atmospheric pressure, humidity, or temperature information).

According to various embodiments of the present disclosure, applications 370 may include an information exchange application that can support the exchange of information between the electronic device and an external electronic device. The information exchange application may include a notification relay application for transferring specific information to an external electronic device or a device management application for managing an external electronic device.

According to various embodiments of the present disclosure, the notification relay application may include a function of transferring, to the external electronic device, notification information generated from other applications of the electronic device 101 (e.g., an SMS/MMS application, an e-mail application, a health management application, or an environmental information application). Further, the notification relay application may receive notification information from an external electronic device and provide the received notification information to a user.

According to various embodiments of the present disclosure, the device management application may manage (e.g., install, delete, or update) at least one function of an external electronic device communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to various embodiments of the present disclosure, the applications 370 may include applications (e.g., a healthcare application of a mobile medical appliance or the like) designated according to an external electronic device. The applications 370 may include an application received from an external electronic device. The applications 370 may include a preloaded application or a third party application that may be downloaded from a server. The names of the components of the program module 310 may change depending on the type of OS.

According to various embodiments of the present disclosure, at least a part of the programming module 310 may be implemented in software, firmware, hardware, or a combination of two or more thereof. At least some of the program module 310 may be implemented (e.g., executed) by the processor. At least some of the program module 310 may include a module, a program, a routine, a set of instructions, and/or a process for performing one or more functions.

According to various embodiments of the present disclosure, an electronic device may include a sensor module configured to acquire phase information of the electronic device; and a processor configured to acquire the phase information of the electronic device through the sensor module while a first application is executed, determine whether the electronic device is rotated based on the phase information, and execute a second application when the electronic device is rotated.

According to various embodiments of the present disclosure, the processor may be configured to check a rotation angle of the electronic device based on the phase information; and determine whether the rotation angle of the electronic device falls within a reference angle range.

According to various embodiments of the present disclosure, the processor may be configured to check a rotation angle of the electronic device based on the phase information; acquire the user's face information through a camera module of the electronic device when the rotation angle of the electronic device falls within a reference angle range; and determine whether a user's face is in a rotated state, based on the user face information.

According to various embodiments of the present disclosure, the processor may be configured to, when the electronic device is rotated, execute one of an application configured for a rotation direction of the electronic device, an application configured for a rotation angle of the electronic device, an application executed before the first application is executed, an application related to the first application, and an application corresponding to an unidentified notification.

According to various embodiments of the present disclosure, the processor may be configured to receive an input through a camera of the electronic device while the second application is executed; and control a function of the electronic device based on the input.

According to various embodiments of the present disclosure, the processor may be configured to, when the electronic device in a rotated state receives a call connection request from an external electronic device, display information indicating the rotated state of the electronic device.

According to various embodiments of the present disclosure, the processor may be configured to display, in a multi-window format, a screen corresponding to the first application and a screen corresponding to the second application.

According to various embodiments of the present disclosure, the processor may be configured to, when the electronic device is rotated, display a soft key corresponding to a physical hard key of the electronic device.

According to various embodiments of the present disclosure, the processor may be configured to disregard an input corresponding to the physical hard key while the soft key is displayed.

According to various embodiments of the present disclosure, the processor may be configured to change an operating mode of the first application from a first mode to a second mode when the electronic device is rotated.

Figure 4:
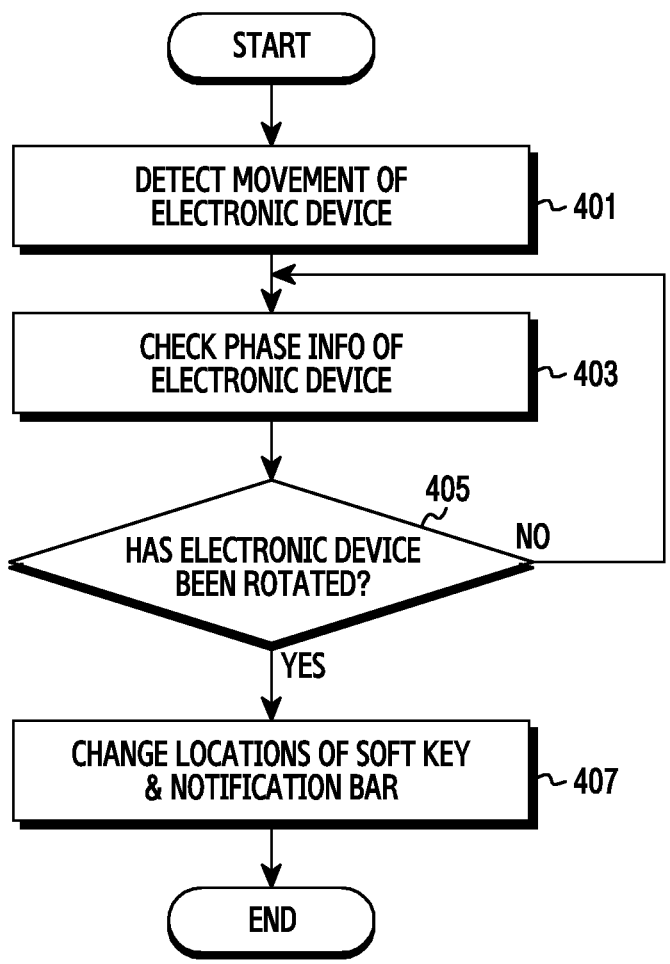
FIG. 4 is a flowchart illustrating a method for changing locations of a soft key and a notification bar in view of phase information of an electronic device, according to various embodiments of the present disclosure.
Figure 5:
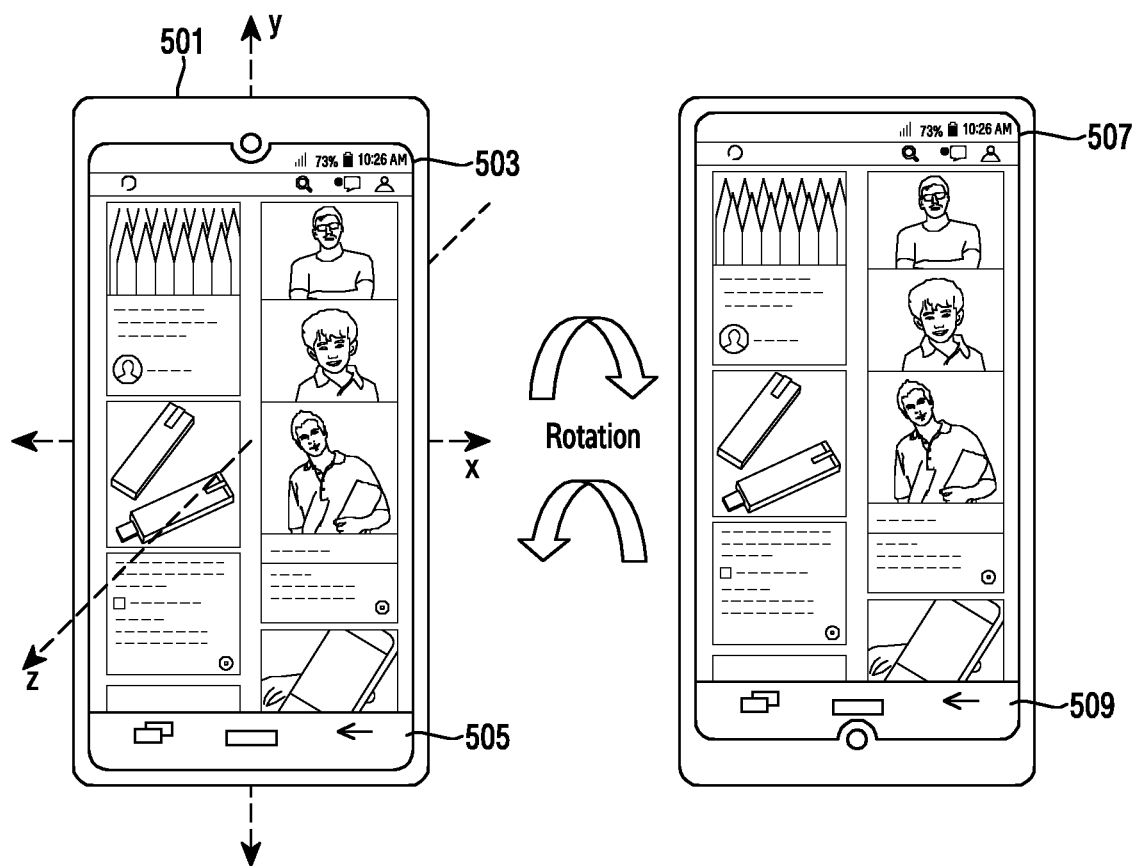
FIG. 5 is a view illustrating a screen configuration for changing locations of a soft key and a notification bar by an electronic device, according to various embodiments of the present disclosure.

FIG. 4 is a flowchart illustrating a method for changing locations of a soft key and a notification bar in view of phase information of an electronic device, according to various embodiments of the present disclosure. FIG. 5 is a view illustrating a screen configuration for changing locations of a soft key and a notification bar by an electronic device, according to various embodiments of the present disclosure. In the following description, an electronic device may include the whole or a part of the electronic device 101 or the electronic device 201.

Referring to FIG. 4, in operation 401, the electronic device may detect the movement thereof. For example, a processor 120 of the electronic device 101 may detect movement information of the electronic device through a gyro sensor, an acceleration sensor, a gravity sensor, etc. The processor 120 may detect the movement of the electronic device based on the movement information of the electronic device. According to an embodiment of the present disclosure, in order to reduce power consumption of the electronic device, the processor may acquire movement information of the electronic device only when a display 160 of the electronic device is activated.

In operation 403, the electronic device may acquire phase information thereof. The processor 120 may acquire phase information of the electronic device through a gyro sensor, an acceleration sensor, a gravity sensor, etc. in response to the detection of the movement of the electronic device. When the display of the electronic device is activated, the processor 120 may recognize the face of a user who uses the electronic device, through a camera module 291. The processor 120 may acquire phase information of the electronic device based on locations of the user's eyes, nose, mouth, and chin. As illustrated in FIG. 5, the display in an activated state may display a notification bar 503 of the electronic device 501 on an upper end part of the display, and may display a soft key 505 on a lower end part thereof. The upper end part of the display may be an area located adjacent to the camera on the display, and the lower end part thereof may be an area located farthest from the camera on the display.

In operation 405, the electronic device may determine whether the electronic device has been rotated based on the phase information of the electronic device. The processor 120 may check the rotation angle of the electronic device based on the phase information of the electronic device. When the rotation angle falls within a reference angle range (e.g., 170 to 190 degrees), the processor 120 may determine that the electronic device has been rotated. For example, when the electronic device 501 is rotated by an angle of 180 degrees with reference to the z-axis and is turned upside down as illustrated in FIG. 5, the processor 120 may determine that the electronic device 501 has been rotated. When the electronic device 501 is rotated with reference to the z-axis as illustrated in FIG. 5, the processor 120 may check the rotation angle of the electronic device 501 based on the phase information of the electronic device 501. When the rotation angle falls within a reference angle range, the processor 120 may determine whether the electronic device 501 is in a rotated state with reference to a user based on a user's facial information (e.g., location information of the user's eyes, nose, mouth, chin, etc.) recognized through the camera module 291. The reference angle range may be changed by the user's configuration so as to have another value.

In operation 407, when the electronic device has been rotated, the electronic device may change locations of a soft key and a notification bar. For example, when the electronic device 501 is rotated by an angle of 180 degrees with reference to the z-axis as illustrated in FIG. 5, the processor 120 may control the display such that a notification bar 507 is displayed on the lower end part of the display and a soft key 509 is displayed on the upper end part thereof. In order to rotate the soft key, the notification bar, or content displayed on the display and prevent the same from being seen by the user, the processor 120 may control the display such that the soft key, the notification bar, or content displayed on the display is rotated in a direction opposite to the rotation direction of the electronic device 501 and is displayed in a rotated state. According to an embodiment of the present disclosure, when the electronic device is rotated, in order to enable a user to recognize the rotation state of the electronic device, the processor 120 may control the display to display the soft key and the notification bar such that a graphic attribute (e.g., shape, size, color, etc.) of at least one of the soft key and the notification bar is changed.

As described above, as a reference angle range for determining whether an electronic device has been rotated, only one reference angle range is described as being configured. According to various embodiments of the present disclosure, multiple reference angle ranges may be configured. For example, the reference angle range may be configured as a first reference angle range (e.g., 80 to 100 degrees), a second reference angle range (e.g., 170 to 190 degrees), and a third reference angle range (e.g., 260 to 280 degrees). The processor 120 may control the display to display the soft key and the notification bar at different locations according to the respective reference angle ranges. Display locations of the soft key and the notification bar, which are configured for each reference angle range, may be changed by a user's configuration.

The electronic device determines whether the electronic device has been rotated, with reference to the z-axis among three axes (e.g., the x-axis, y-axis, and z-axis). According to various embodiments of the present disclosure, the electronic device may determine whether the electronic device has been rotated, in view of a location relative to a user. For example, when the electronic device is rotated by an angle of 180 degrees such that the camera located at the upper end part of the display is located at the lower end part thereof while a user stares at the display of the electronic device, the processor 120 may determine that the electronic device has been rotated.

Figure 6:
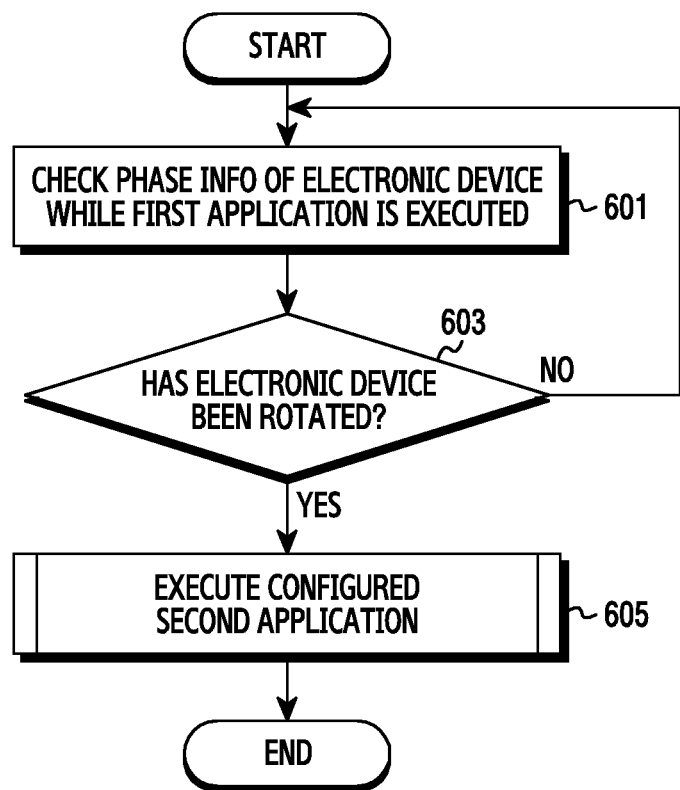
FIG. 6 is a flowchart illustrating a method for executing an application in view of the rotation of an electronic device, according to various embodiments of the present disclosure.

FIG. 6 is a flowchart illustrating a method for executing an application in view of the rotation of an electronic device, according to various embodiments of the present disclosure In the following description, the electronic device may include the whole or a part of the electronic device 101 or the electronic device 201.

Referring to FIG. 6, in operation 601, the electronic device may acquire phase information of the electronic device while a first application is executed. While the electronic device executes a first application (e.g., a social application), the processor 120 of the electronic device 101 may acquire movement information for determining whether the electronic device is moved, by using a gyro sensor, an acceleration sensor, a gravity sensor, etc. When the electronic device is moved, the processor 120 may acquire phase information of the electronic device by using at least one of a gyro sensor, an acceleration sensor, a gravity sensor, and a camera module. According to an embodiment of the present disclosure, the processor 120 may control the display to display at least one of a soft key and a notification bar while the display 160 of the electronic device is activated. As illustrated in FIG. 5, while the display is activated, the processor 120 may control the display such that the notification bar 503 is displayed on the upper end part of the display and such that the soft key 505 is displayed on the lower end part thereof.

In operation 603, the electronic device may determine whether the electronic device has been rotated based on the phase information of the electronic device. As illustrated in FIG. 5, the processor 120 may check an angle by which the electronic device 501 is rotated with reference to the z-axis, based on the phase information of the electronic device 501, and then may determine whether the checked angle falls within a reference angle range. When the rotation angle of the electronic device 501 rotated with reference to the z-axis falls within the reference angle range, the processor 120 may determine that the electronic device 501 has been rotated. As illustrated in FIG. 5, the processor 120 may check an angle by which the electronic device 501 is rotated with reference to the z-axis, based on the phase information of the electronic device 501. When the rotation angle of the electronic device 501 falls within a reference angle range, the processor 120 may check the location of the user's eyes, nose, mouth, chin, etc. recognized through the camera module 291. The processor 120 may determine whether the user's face is in a rotated state based on the location of the user's eyes, nose, mouth, chin, etc. When the user's face is in a rotated state, the processor 120 may determine that the electronic device 501 has been rotated. When the electronic device 501 is not rotated, the processor 120 may again perform operation 601 of checking phase information of the electronic device while the first application is executed.

When it is determined in operation 603 that the electronic device has been rotated, in operation 605, the electronic device may execute a configured second application. The processor 120 may execute the second application configured for a direction in which the electronic device is rotated among multiple applications configured according to the respective rotation directions of the electronic device. The processor 120 may execute the second application before the execution of the first application. The processor 120 may execute the second application related to the first application. For example, when the electronic device is rotated while a camera application is executed, the processor 120 may executed a gallery application related to the camera application among multiple applications installed in the electronic device. When the second application is executed, the processor 120 may control the display such that a screen corresponding to the first application and a screen corresponding to the second application are displayed in a multi-window format or such that a screen corresponding to the second application is displayed instead of a screen corresponding to the first application. In order to rotate a screen corresponding to an application and prevent the same from being seen by the user, the processor 120 may control the display such that the screen corresponding to the application is rotated in a direction opposite to the rotation direction of the electronic device and is displayed in a rotated state.

According to an embodiment of the present disclosure, when there exists an unidentified notification (e.g., the reception of a call connection request or the reception of a message), the processor 120 may execute an application corresponding to the unidentified notification rather than the configured second application. When the electronic device is rotated while a message notification according to the reception of a message is displayed, the processor 120 may execute an application corresponding to the unidentified notification. When the electronic device is rotated while a notification bar and a soft key are displayed, as in operation 407, the processor 120 may control the display to change locations of the soft key and the notification bar. As illustrated in FIG. 5, when the electronic device 501 is rotated by an angle of 180 degrees in the clockwise or counterclockwise direction with reference to the z-axis, the processor 120 may control the display such that the notification bar 507 is displayed on the lower end part of the display and the soft key 509 is displayed on the upper end part thereof. The upper end part of the display may represent an area located adjacent to the camera module on the display, and the lower end part thereof may represent an area located farthest from the camera on the display.

According to various embodiments of the present disclosure, when the electronic device is rotated after the execution of the second application configured according to the rotation of the electronic device, the electronic device may execute the first application. For example, when, while the electronic device is rotated by an angle of 180 degrees and the second application is executed, the electronic device is re-rotated by an angle of 180 degrees, the processor 120 may determine whether a screen corresponding to the first application and a screen corresponding to the second application are displayed in a multi-window format. When only the screen corresponding to the second application is displayed, the processor 120 may control the display such that the screen corresponding to the second application is removed and then, the screen corresponding to the first application is displayed. When the screen corresponding to the first application and the screen corresponding to the second application are displayed in a multi-window format, the processor 120 may remove the screen corresponding to the second application. The screen corresponding to the first application may be displayed so as to extend to an area on which the screen corresponding to the second application has been displayed.

As described above, one reference angle range is described as a reference angle range for determining whether an electronic device has been rotated. According to various embodiments of the present disclosure, multiple reference angle ranges may be configured. For example, the reference angle range may be configured as a first reference angle range (e.g., 80 to 100 degrees), a second reference angle range (e.g., 170 to 190 degrees), and a third reference angle range (e.g., 260 to 280 degrees). The respective reference angle ranges may be configured to allow execution of different applications. When the electronic device has been rotated, the processor 120 may execute an application corresponding to a reference angle range including an angle by which the electronic device is rotated among the multiple reference angle ranges.

Figure 7:
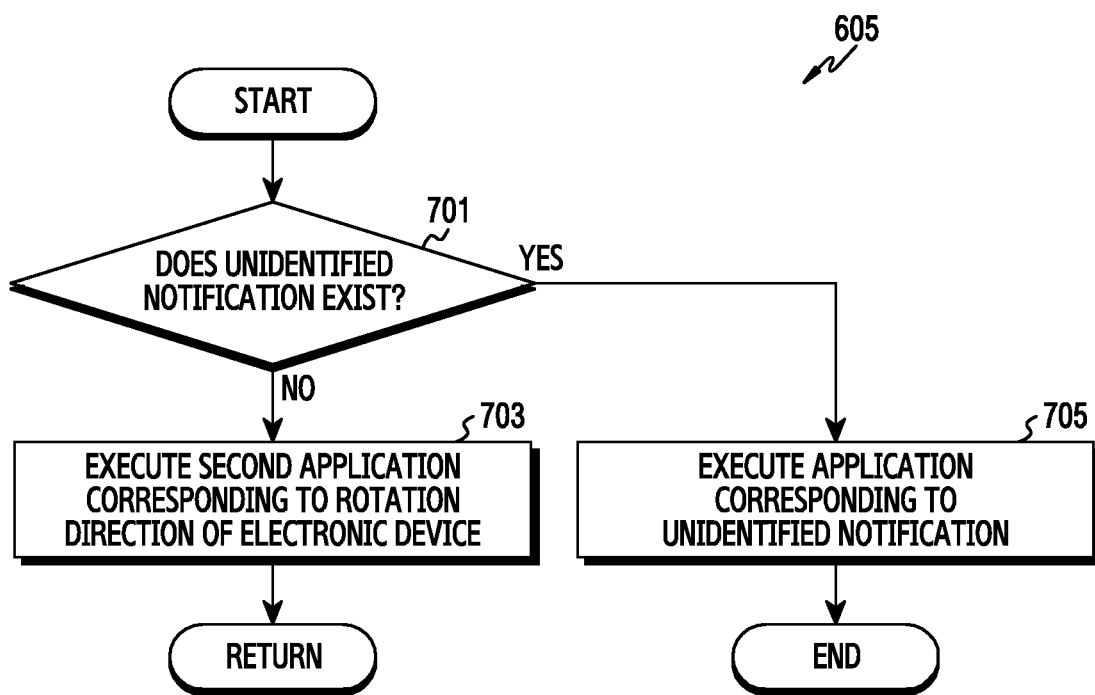
FIG. 7 is a flowchart illustrating the execution of a configured second application by an electronic device, according to various embodiments of the present disclosure.

FIG. 7 is a flowchart illustrating the execution of a configured second application by an electronic device, according to various embodiments of the present disclosure. FIGS. 8A to 8E are views each illustrating a screen configuration for executing an application in view of the rotation of an electronic device, according to various embodiments of the present disclosure. Hereinafter, an operation of executing the configured second application in operation 605 of FIG. 6 will be described. In the following description, an electronic device may include the whole or a part of the electronic device 101 or the electronic device 201.

Referring to FIG. 7, in operation 701, when the electronic device has been rotated, the electronic device may determine whether an unidentified notification exists. A processor 120 of the electronic device 101 may determine whether the electronic device has been rotated during (or after) display of a call connection request screen for notifying of the reception of a call connection request from an external electronic device. When the electronic device has been rotated while (or after) the call connection request screen is displayed, the processor 120 may determine that an unidentified notification exists. The processor 120 may determine whether the electronic device has been rotated during display of notification information of the reception of a text message from an external electronic device. When the electronic device has been rotated while the notification information is displayed, the processor 120 may determine that an unidentified notification exists.

Figure 8A:
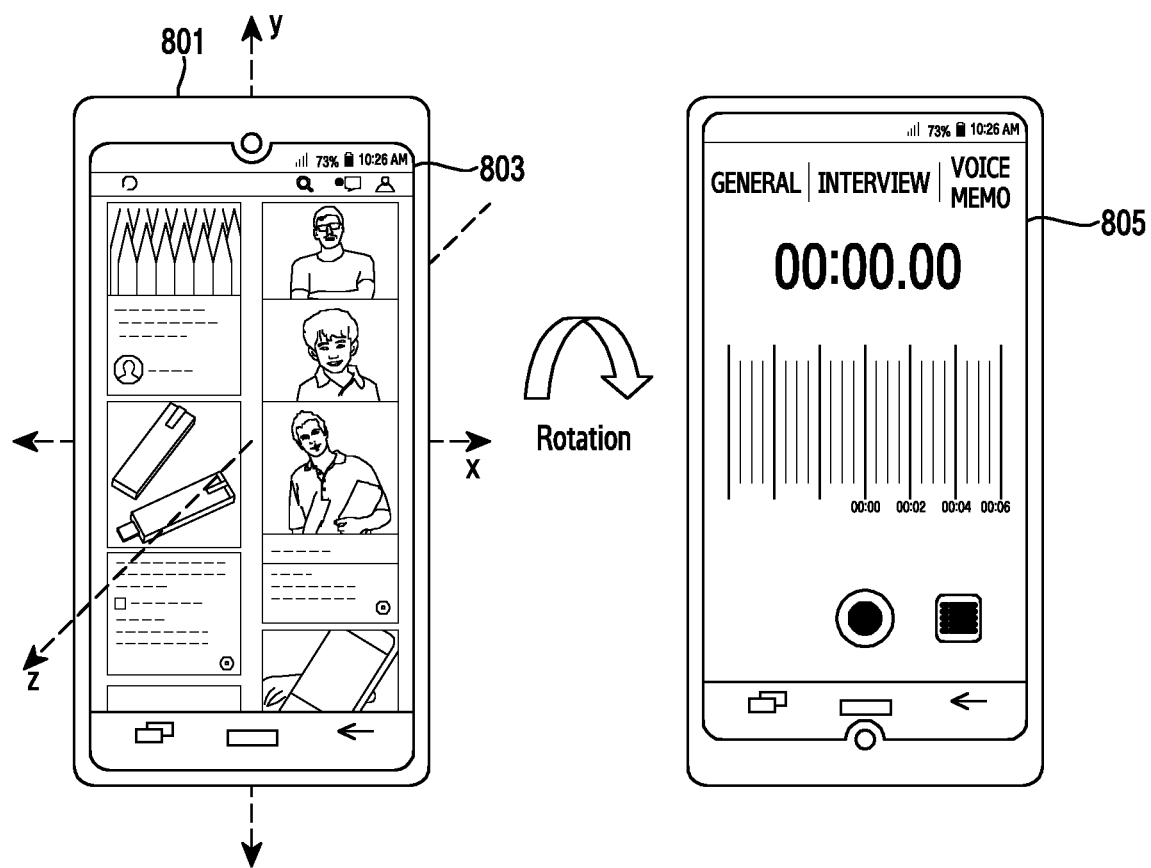
FIGS. 8A to 8E are views each illustrating a screen configuration for executing an application in view of the rotation of an electronic device, according to various embodiments of the present disclosure.

When it is determined in operation 701 that an unidentified notification does not exist, in operation 703, the electronic device may execute the second application corresponding to the rotation direction of the electronic device. As illustrated in FIG. 8A, when the electronic device 801 is rotated by an angle of 180 degrees in the clockwise direction with reference to the z-axis while a screen 803 corresponding to a social application is displayed, the processor 120 may load a list of applications, which are configured according to the respective rotation directions of the electronic device, from a memory 130. The processor 120 may check, through the loaded list, that an application corresponding to the clockwise direction is a voice memo application. The processor 120 may control the display to switch the screen 803 corresponding to the social application to a screen 805 corresponding to the voice memo application.

Figure 8B:
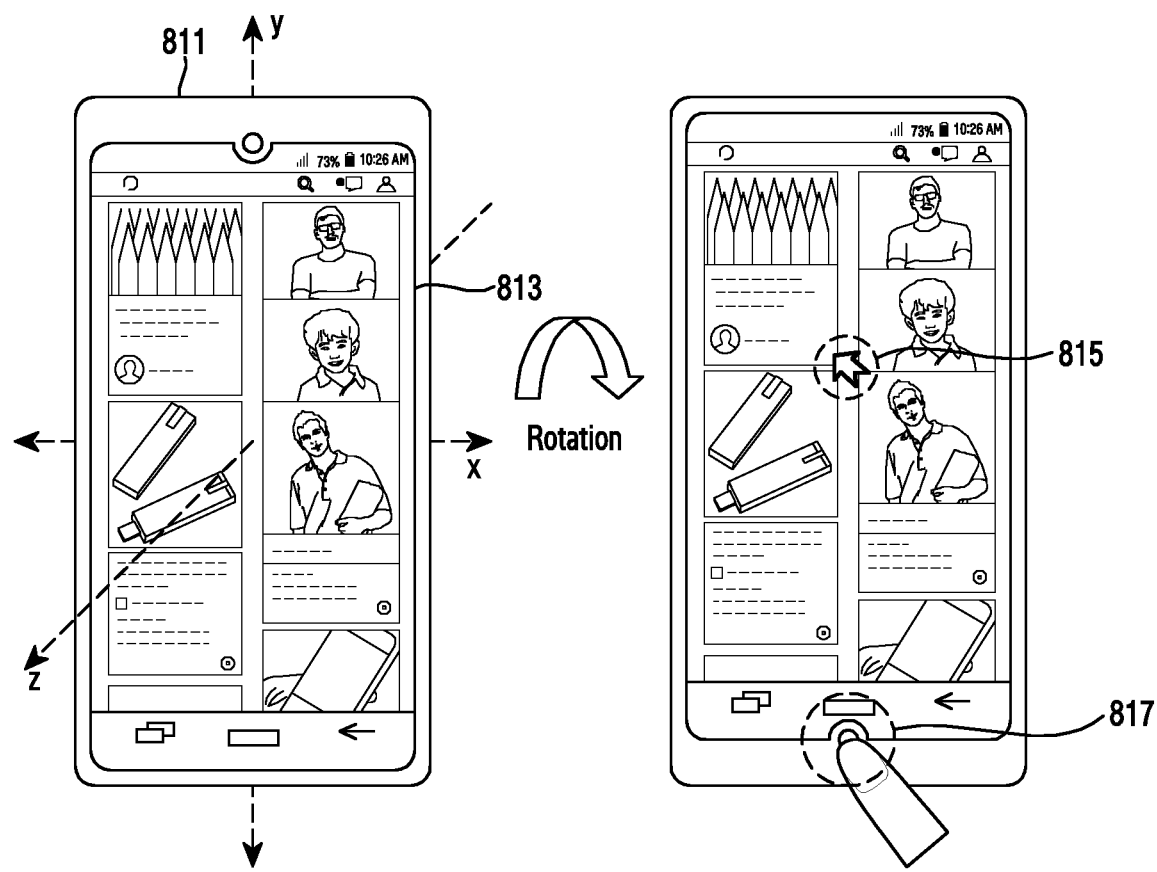

As illustrated in FIG. 8B, when the electronic device 811 is rotated by an angle of 180 degrees in the clockwise direction with reference to the z-axis while a screen 813 corresponding to a social application is displayed, the processor 120 may load a list of applications, which are configured according to the respective rotation directions of the electronic device, from the memory 130 and may check, through the loaded list, that an application configured for the clockwise direction is an application providing a cursor function. The processor 120 may execute the application providing a cursor function and may control the display to display a cursor pointer 815 on the screen 813 corresponding to the social application. The processor 120 may move the cursor pointer 815 based on a user input received through a camera module 817 or a touch input on the display.

Figure 8C:
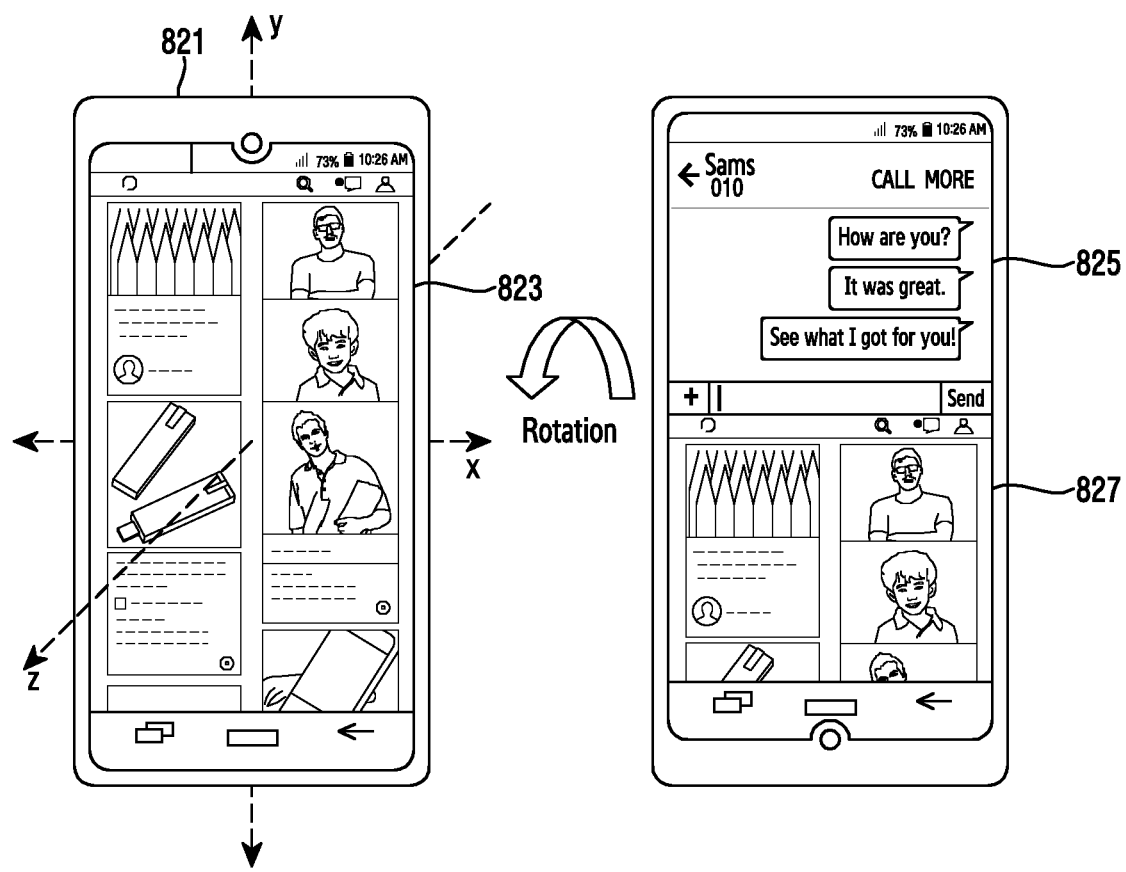

As illustrated in FIG. 8C, when the electronic device 821 is rotated by an angle of 180 degrees in the counterclockwise direction with reference to the z-axis while a screen 823 corresponding to a social application is displayed, the processor 120 may load a list of applications, which are configured according to the respective rotation directions of the electronic device, from the memory 130 and may check, through the loaded list, that an application configured for the counterclockwise direction is a message application. The processor 120 may control the display such that a screen 825 corresponding to the message application and a screen 827 corresponding to a social application are displayed in a multi-window format. According to an embodiment of the present disclosure, when the first and second applications are displayed in multiple windows, the processor 120 may control the display to display a keypad for a text input on a lower end part of a screen corresponding to one application which supports a text input function among the first and second applications.

Figure 8D:
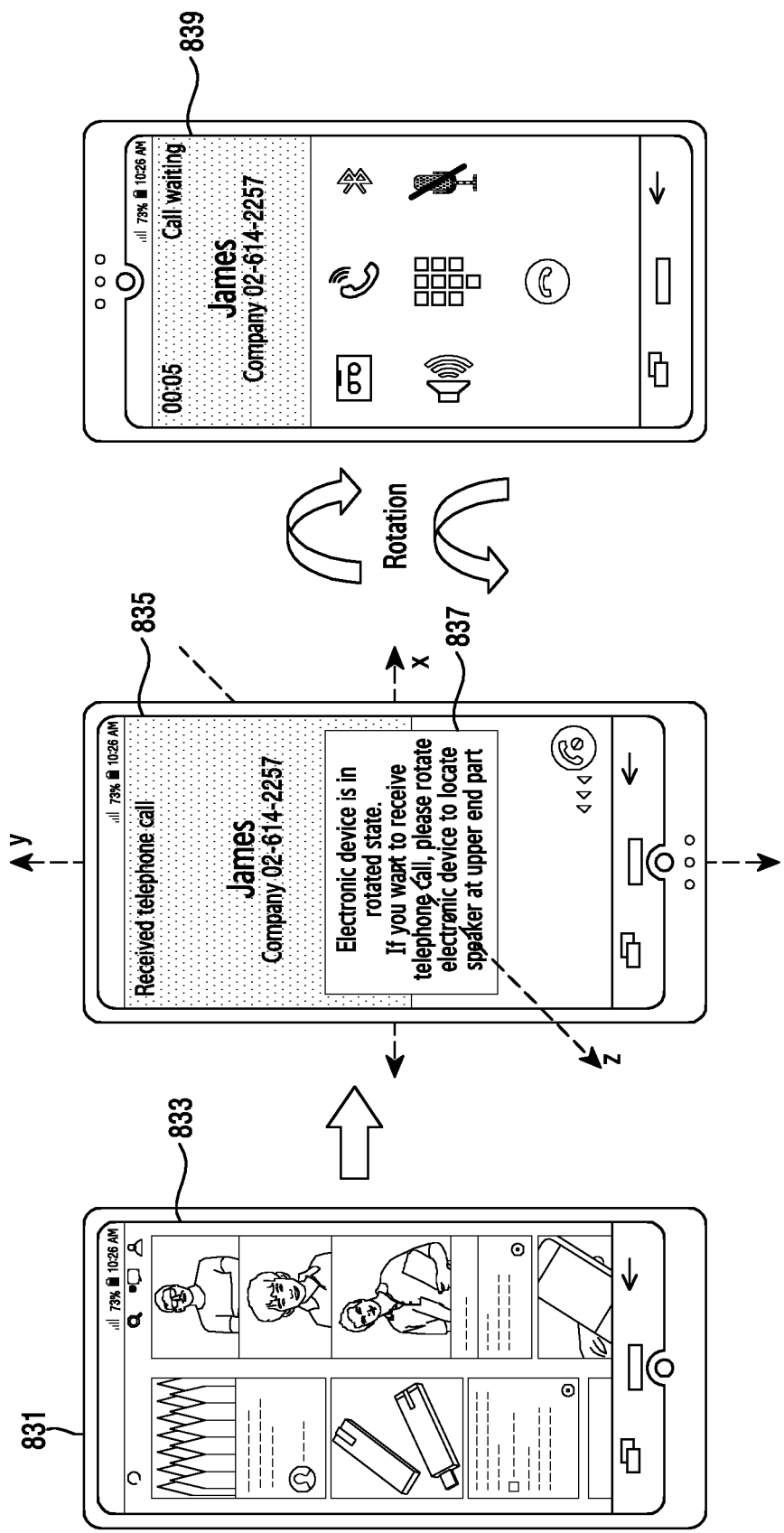

When it is determined in operation 701 that the unidentified notification exists, in operation 705, the electronic device may execute an application corresponding to the unidentified notification. As illustrated in FIG. 8D, the processor 120 may receive a call connection request from an external electronic device while a screen 833 corresponding to a social application is displayed on the display in a state where the electronic device 831 is rotated by an angle of 180 degrees (e.g., a speaker is located at a lower end part of the electronic device). The processor 120 may control the display to display a call connection request screen 835 in response to the reception of the call connection request. The processor 120 may control the display to display a message 837 for inducing the rotation of the electronic device 831 so as to locate the speaker, which is located at a lower end part of the electronic device 831, beside a user's ear. When the electronic device 831 is rotated in the clockwise or counterclockwise direction while a call connection request screen 835 is displayed, the processor 120 may control the display to display a screen 839 corresponding to a telephone application.

Figure 8E:
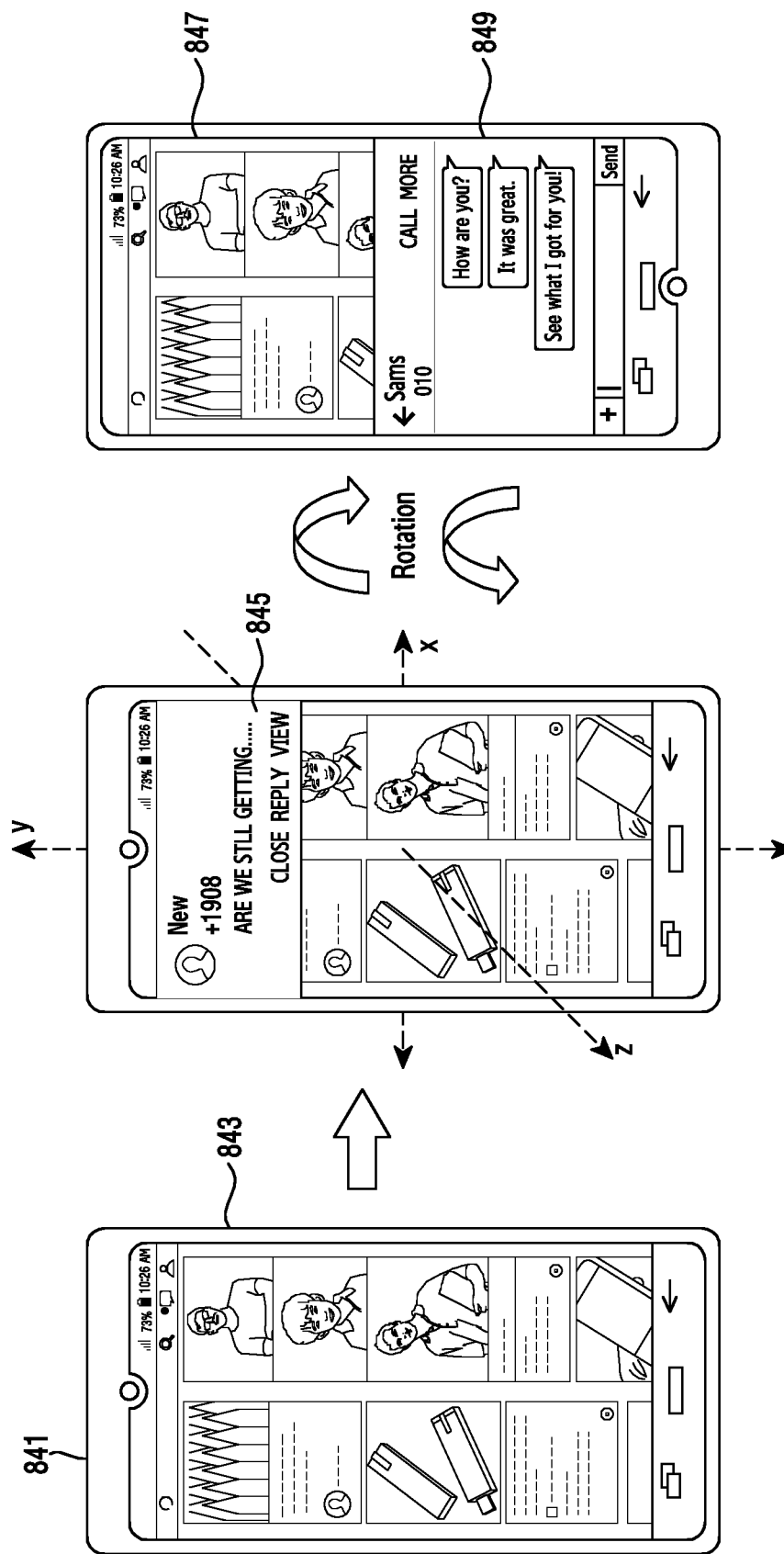

As illustrated in FIG. 8E, the processor 120 may control the display to display, on a partial area of a screen, notification information 845 for notifying of the reception of a text message from an external electronic device while a screen 843 corresponding to a social application is displayed on a screen of the electronic device 841. When the electronic device 841 is rotated in the clockwise or counterclockwise direction with reference to the z-axis while the notification information 845 is displayed, the processor 120 may control the display such that a screen 847 corresponding to a message application and a screen 849 corresponding to a social application are displayed in multiple windows. The processor 120 may control the display to display a keypad for text input on a lower end part of a screen 847 corresponding to a text application which supports a text input function.

Figure 9:
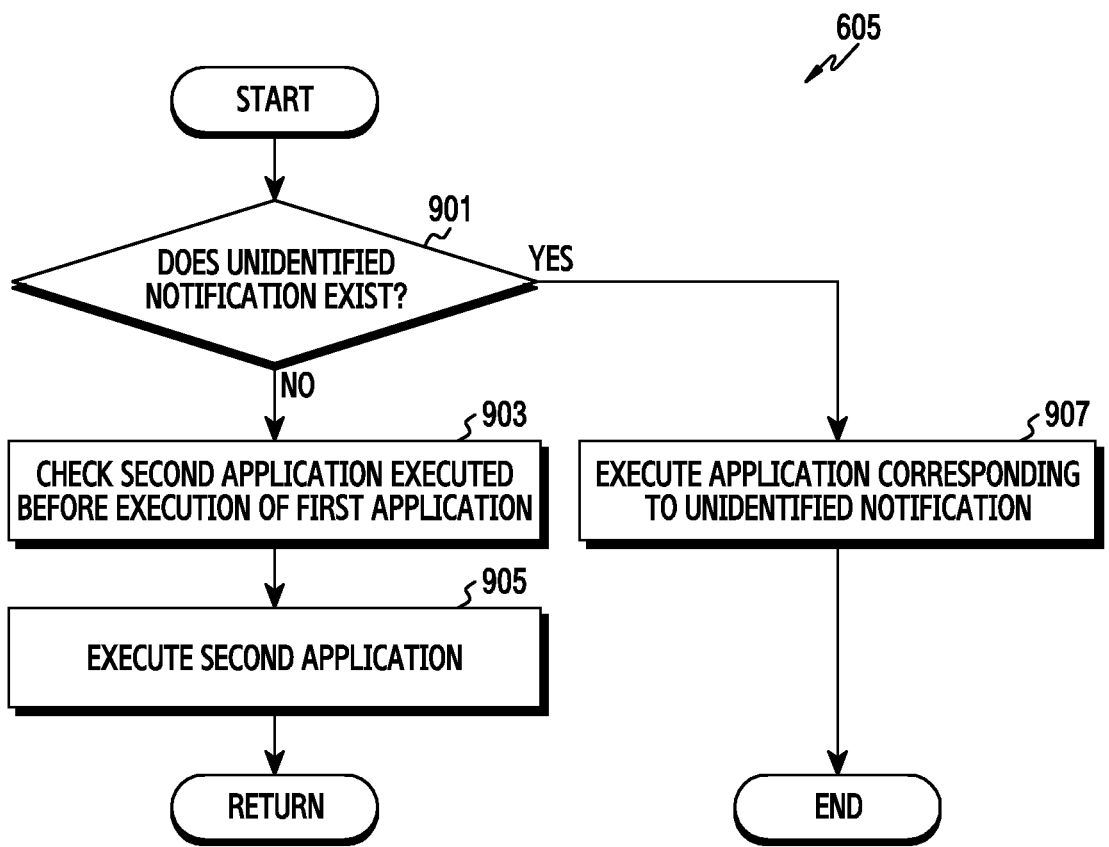
FIG. 9 is a flowchart illustrating the execution of a configured second application by an electronic device, according to various embodiments of the present disclosure.

FIG. 9 is a flowchart illustrating the execution of a configured second application by an electronic device, according to various embodiments of the present disclosure. Hereinafter, an operation of executing the configured second application in operation 605 of FIG. 6 will be described. In the following description, an electronic device may include the whole or a part of the electronic device 101 or the electronic device 201.

Referring to FIG. 9, in operation 901, when the electronic device has been rotated, the electronic device may determine whether an unidentified notification exists. As in operation 701, a processor 120 of the electronic device 101 may determine whether the electronic device has been rotated during display of notification information of a text message received from an external electronic device. When the electronic device has been rotated while the notification information is displayed, the processor 120 may determine that an unidentified notification exists.

When it is determined in operation 901 that the unidentified notification does not exist, in operation 903, the electronic device may check that the second application executed before the execution of the first application. For example, the processor 120 may check log information, which is obtained by recording applications executed by the electronic device, from a memory 130 and may check that an application executed before the execution of a voice memo application by the electronic device is a social application. The log information may include information on applications executed by the electronic device, and may be updated whenever the electronic device executes an application.

In operation 905, the electronic device may execute the second application. For example, the processor 120 may control the display such that a screen corresponding to the voice memo application is switched to a screen corresponding to the social application executed before the execution of the voice memo application. The processor 120 may control the display 160 such that the screen corresponding to the voice memo application and the screen corresponding to the social application executed before the execution of the voice memo application are displayed in multiple windows.

When it is determined in operation 901 that an unidentified notification exists, in operation 907, the electronic device may execute an application corresponding to the unidentified notification. For example, when the electronic device is rotated in the clockwise or counterclockwise direction while a call connection request screen is displayed in response to the reception of a call connection request from an external electronic device, the processor 120 may determine that an unidentified notification exists. The processor 120 may control the display to display a screen corresponding to a telephone application for performing a call connection.

Figure 10:
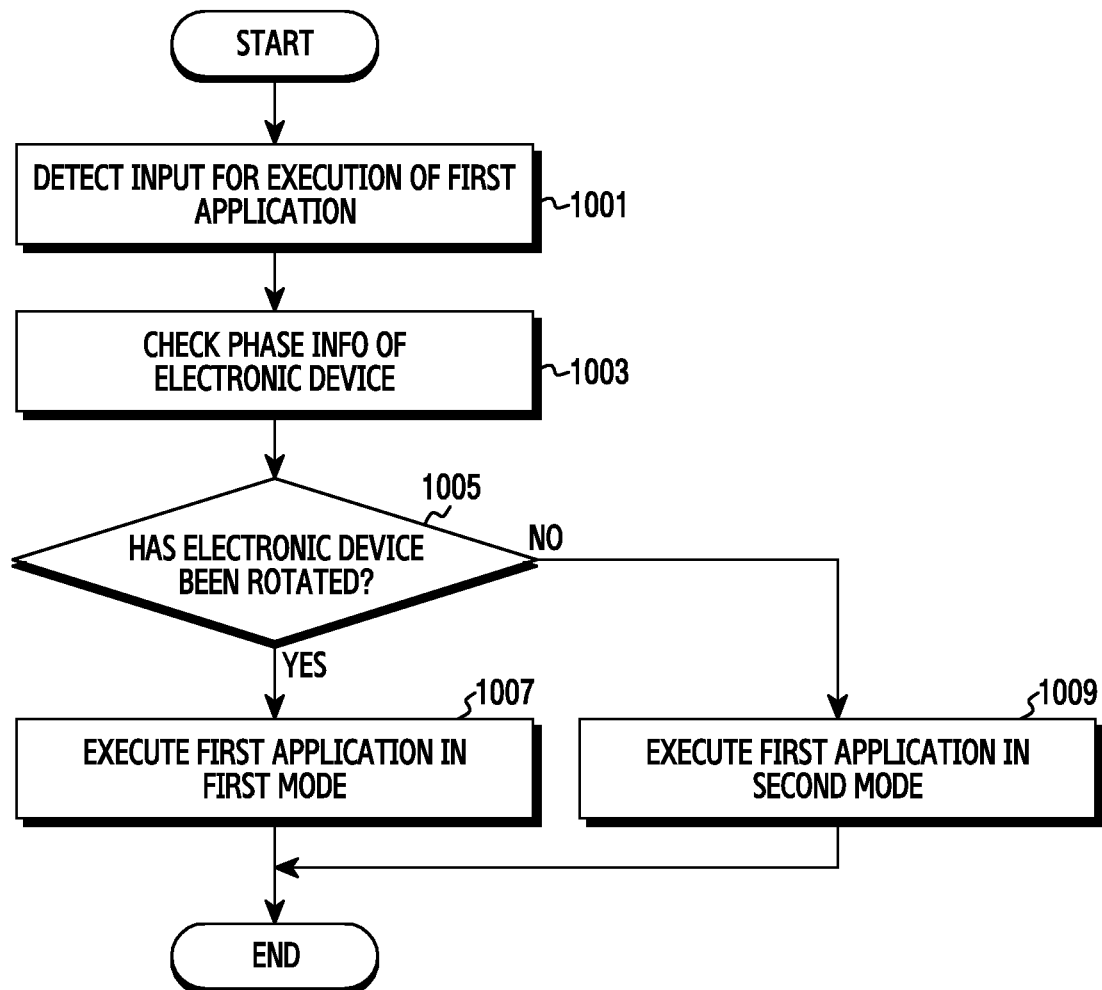
FIG. 10 is a flowchart illustrating a method for determining an operating mode of an application in view of phase information of an electronic device, according to various embodiments of the present disclosure.
Figure 11A:
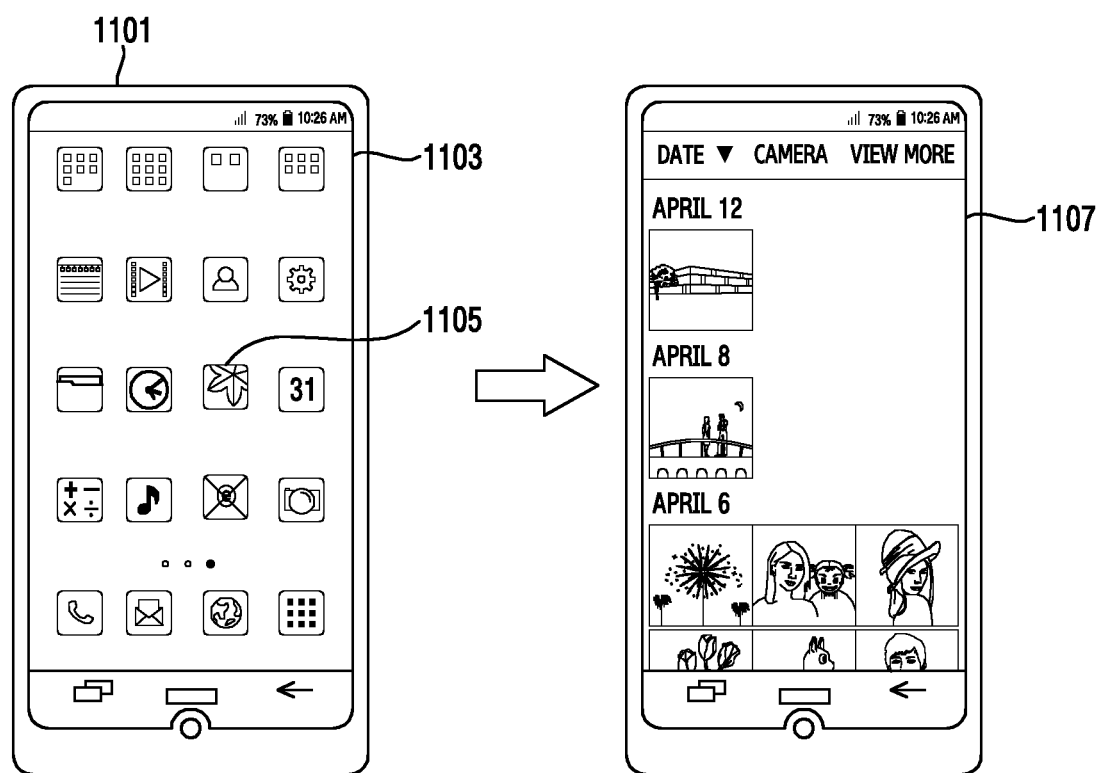
FIGS. 11A and 11B are views each illustrating a screen configuration for determining an operating mode of an application in view of phase information of an electronic device, according to various embodiments of the present disclosure.
Figure 11B:
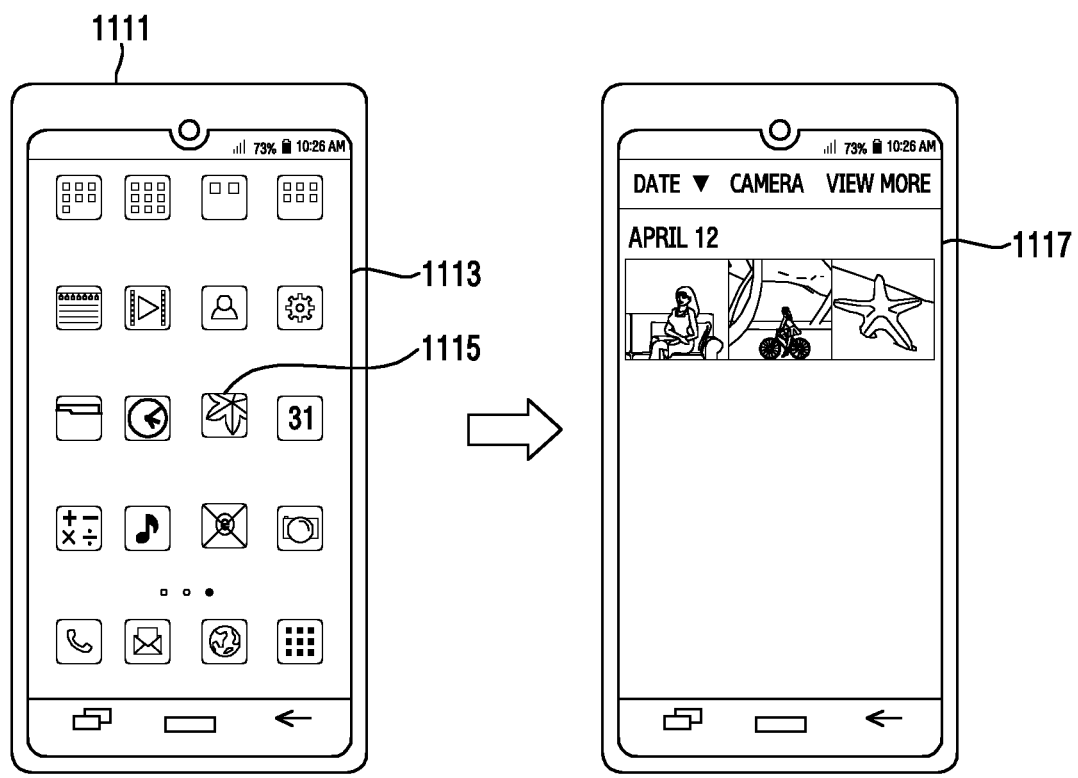

FIG. 10 is a flowchart illustrating a method for determining an operating mode of an application in view of phase information of an electronic device, according to various embodiments of the present disclosure. FIGS. 11A and 11B are views each illustrating a screen configuration for determining an operating mode of an application in view of phase information of an electronic device, according to various embodiments of the present disclosure. In the following description, an electronic device may include the whole or a part of the electronic device 101 or the electronic device 201.

Referring to FIG. 10, in operation 1001, the electronic device may detect an input for executing a first application. As illustrated in FIG. 11A, a processor 120 of the electronic device 1101 may detect a touch input to an icon 1105 corresponding to a gallery application among icons respectively corresponding to multiple applications being displayed on a display 1103 of the electronic device 1101.

In operation 1003, the electronic device may acquire phase information thereof. The processor 120 may acquire phase information of the electronic device by using a gyro sensor, an acceleration sensor, a gravity sensor, and a camera.

In operation 1005, the electronic device may determine whether the electronic device is in a rotated state based on the phase information of the electronic device. The processor 120 may determine whether the electronic device is in a rotated state based on the user's face information acquired through the camera of the electronic device. The processor 120 may check locations of the user's eyes and mouth included in the user's face information, and then may determine whether the electronic device is in a rotated state by comparing the location of the user's eyes with that of the user's mouth. The processor 120 may determine whether the electronic device is in a rotated state based on sensing information which is output from a geomagnetic sensor of the electronic device, an acceleration sensor thereof, or a gravity sensor thereof.

When it is determined in operation 1005 that the electronic device is in a rotated state, in operation 1007, the electronic device may execute the first application in a first mode. As illustrated in FIG. 11A, when the electronic device 1101 is rotated by an angle of 180 degrees with reference to the z-axis, the processor 120 may execute a gallery application in a normal mode. The processor 120 may control the display 160 to display on a screen 1107 an image or video for which security is not configured among at least one image or video included in the gallery application. Security may be configured or released for each image or video based on a user input.

When it is determined in operation 1005 that the electronic device is not rotated, in operation 1009, the electronic device may execute the first application in a second mode. As illustrated in FIG. 11B, when, in a state where the electronic device 1111 is not rotated, a touch is performed on an icon 1115 corresponding to a gallery application displayed on a display 1113, the processor 120 may execute the gallery application in a security mode. The processor 120 may control the display to display on a screen 1117 an image or video for which security is configured among at least one image or video included in the gallery application.

Figure 12:
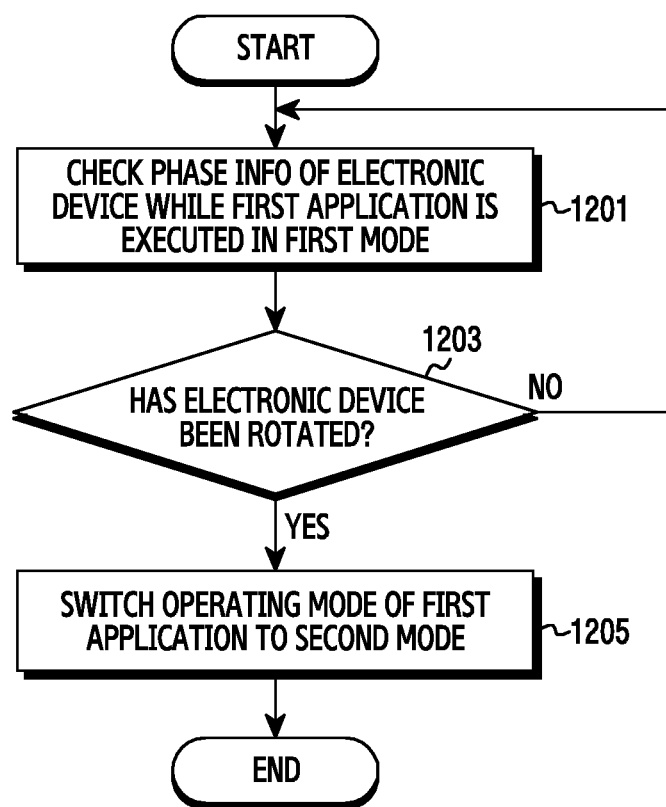
FIG. 12 is a flowchart illustrating a method for changing an operating mode of an application by an electronic device, according to various embodiments of the present disclosure.
Figure 13A:
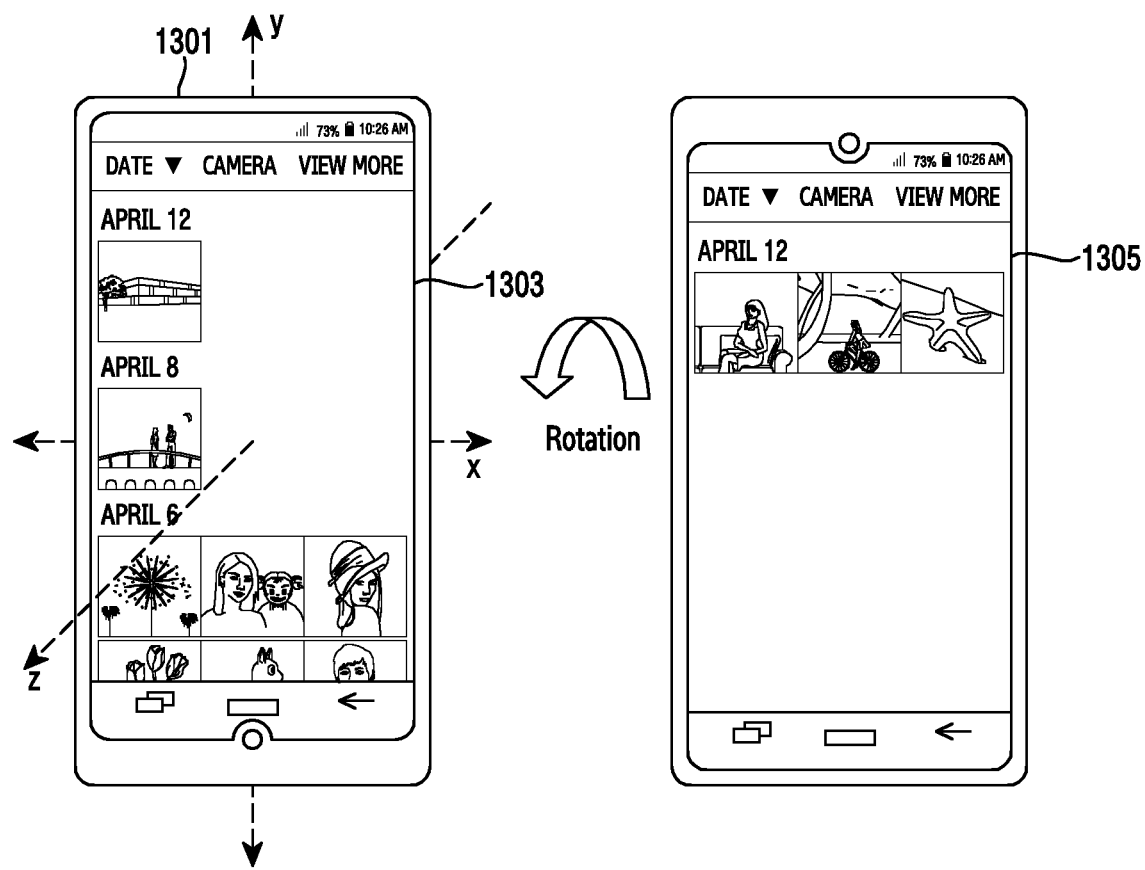
FIGS. 13A and 13B are views each illustrating a screen configuration for changing an operating mode of an application by an electronic device, according to various embodiments of the present disclosure.
Figure 13B:
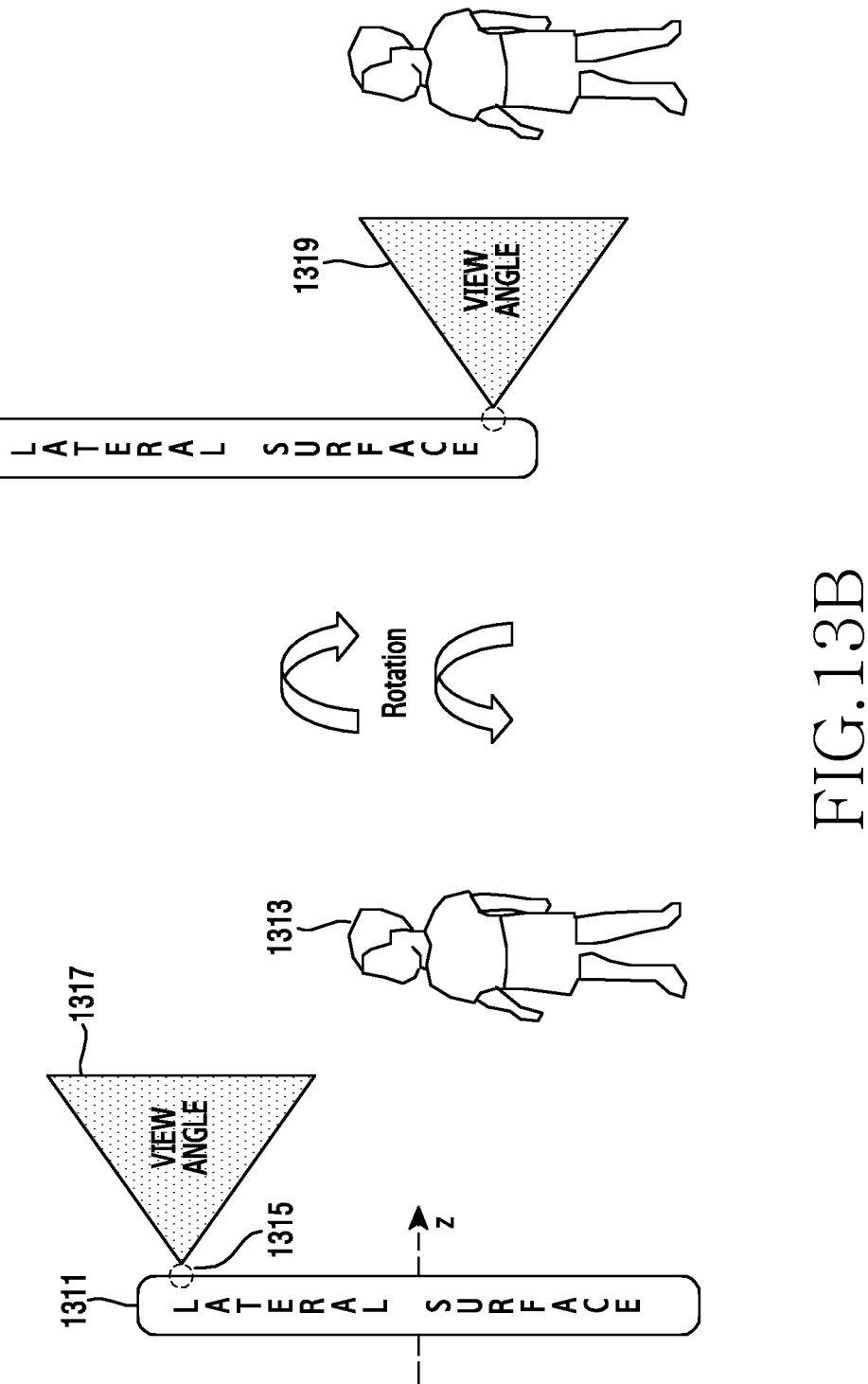

FIG. 12 is a flowchart illustrating a method for changing an operating mode of an application by an electronic device, according to various embodiments of the present disclosure. FIGS. 13A and 13B are views each illustrating a screen configuration for changing an operating mode of an application by an electronic device, according to various embodiments of the present disclosure. In the following description, an electronic device may include the whole or a part of the electronic device 101 or the electronic device 201.

Referring to FIG. 12, in operation 1201, the electronic device may acquire phase information of the electronic device while a first application is executed in a first mode. As illustrated in FIG. 13A, while a gallery application is executed in a normal mode, a processor 120 of the electronic device 1301 may acquire phase information of the electronic device by using gyro sensor, an acceleration sensor, a gravity sensor, and a camera module. The processor 120 may control a display 160 to display on a screen 1303 an image or video for which security is not configured among at least one image or video included in the gallery application while the gallery application is executed in the normal mode.

In operation 1203, the electronic device may determine whether the electronic device has been rotated based on the phase information. As illustrated in FIG. 13A, the processor 120 may check an angle by which the electronic device 1301 is rotated with reference to the z-axis, based on the phase information of the electronic device 1301. The processor 120 may determine whether the rotation angle of the electronic device 1301 falls within a reference angle range (e.g., 170 to 190 degrees). When the rotation angle of the electronic device 1301 falls within the reference angle range, the processor 120 may determine that the electronic device 1301 has been rotated. The processor 120 may check an angle by which the electronic device 1301 is rotated with reference to the z-axis, based on the phase information of the electronic device 1301. When the rotation angle of the electronic device 1301 falls within the reference angle range, the processor 120 may determine whether a user's face has been rotated based on the location of the user's eyes, nose, mouth, chin, etc. recognized through the camera module 291. When the user's face has been rotated, the processor 120 may determine that the electronic device 1301 has been rotated. When the electronic device 1301 is not rotated, the processor 120 may again perform operation 1201 of checking state information of the electronic device while the first application is executed in the first mode. The reference angle range may be changed by the user so as to have another value.

When it is determined in operation 1203 that the electronic device has been rotated, in operation 1205, the electronic device may switch an operating mode of the first application to a second mode. As illustrated in FIG. 13A, when, in a state where the electronic device 1301 executes the gallery application in the normal mode, the electronic device 1301 is rotated by an angle of 180 degrees in the counterclockwise or clockwise direction with reference to the z-axis, the processor 120 may switch an operating mode of the gallery application to a security mode. The processor 120 may control the display to display on a screen 1305 an image or video for which security is configured among at least one image or video included in the gallery application while the gallery application is executed in the security mode.

As illustrated in FIG. 13B, when, in a state where the electronic device 1311 executes a camera application in a normal mode, the electronic device 1311 is rotated with reference to the z-axis, the processor 120 may switch an operating mode of the camera application to a child-subject mode. The processor 120 may acquire an image or video of a low subject 1313 by using a camera 1315 having a view angle 1317 changed to view angle 1319 due to the rotation of the electronic device 1311. While the camera application is executed in the child-subject mode, the processor 120 may change at least one of a shutter speed and an International Organization for Standardization (IOS) configuration so as to be appropriate to photograph a quickly moving subject (e.g., children running, animals playing, etc.), and may output a sound and the like for guiding the location of the camera so as to induce the subject to stare at the camera. While the camera application is executed in the child-subject mode, the processor 120 may configure a shutter to have a high speed, may configure a highly-sensitive IOS, and may output configured music. The camera 1315 may be disposed on the front or rear surface of the electronic device 1311.

Figure 14:
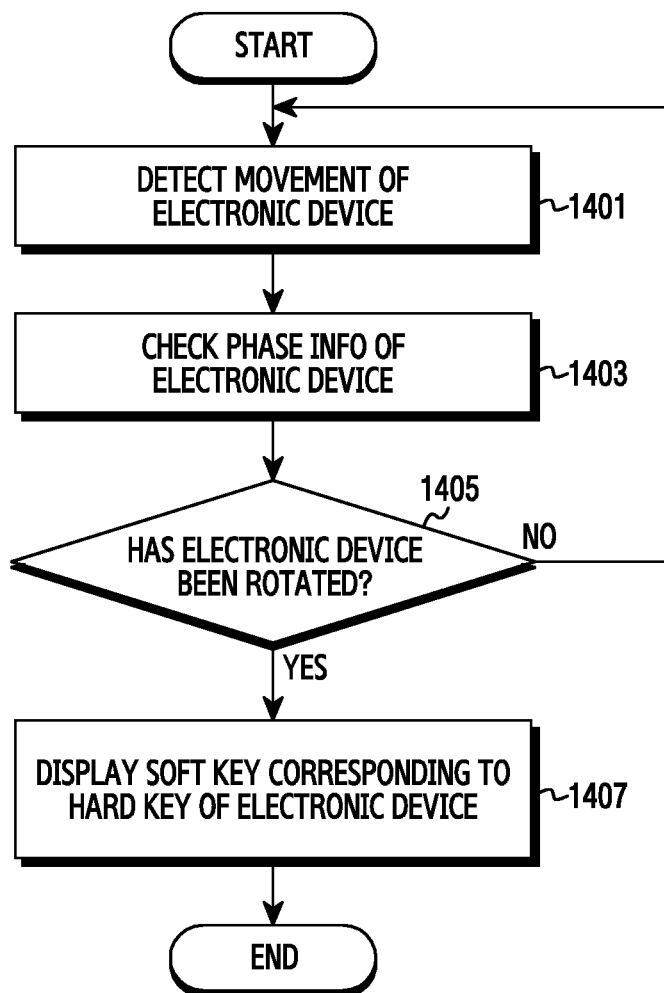
FIG. 14 is a flowchart illustrating a method for displaying a soft key in view of phase information of an electronic device, according to various embodiments of the present disclosure.
Figure 15:
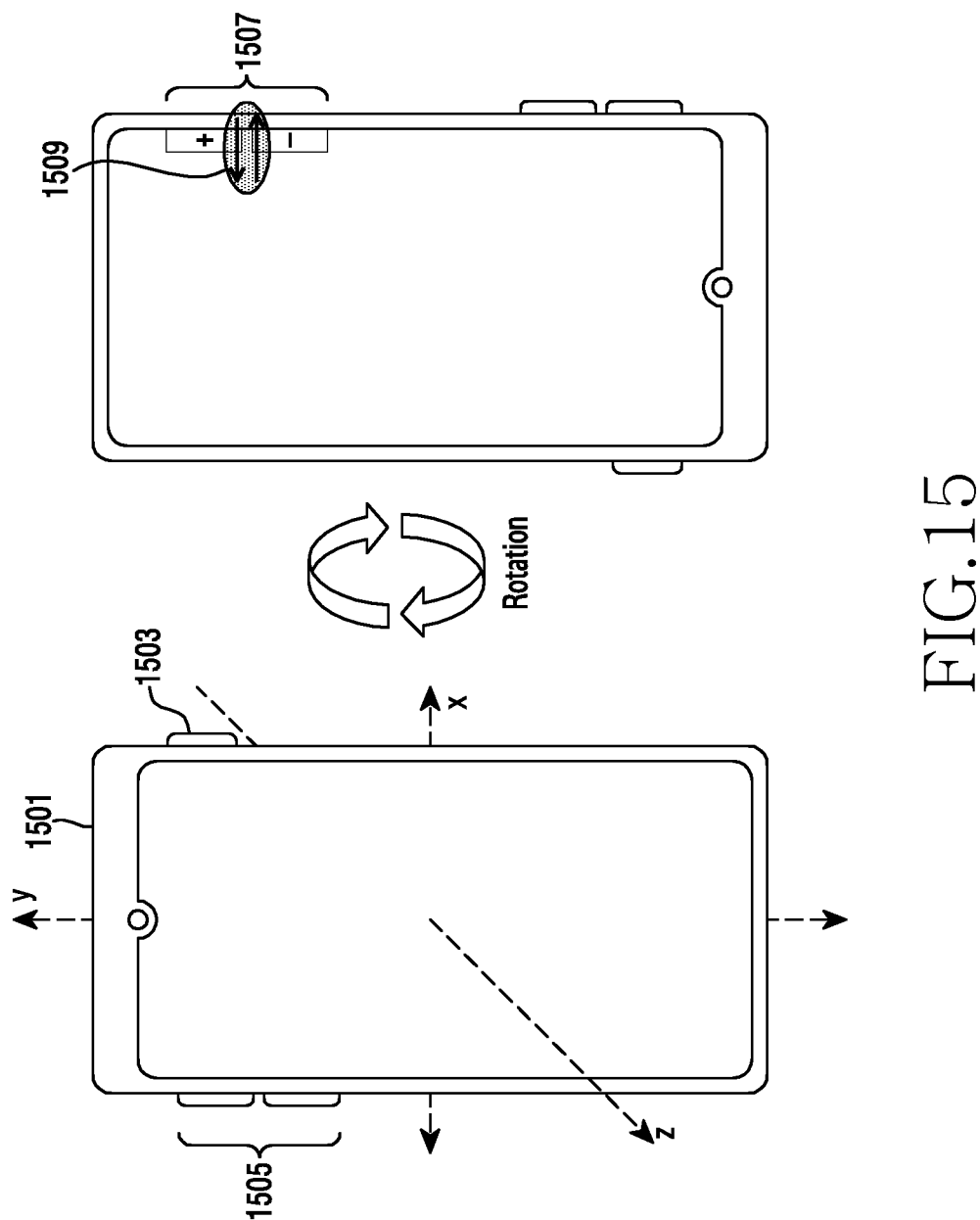
FIG. 15 is a flowchart illustrating a screen configuration for displaying a soft key in view of phase information of an electronic device, according to various embodiments of the present disclosure.

FIG. 14 is a flowchart illustrating a method for displaying a soft key in view of phase information of an electronic device, according to various embodiments of the present disclosure. FIG. 15 is a flowchart illustrating a screen configuration for displaying a soft key in view of phase information of an electronic device, according to various embodiments of the present disclosure. In the following description, an electronic device may include the whole or a part of the electronic device 101 or the electronic device 201.

Referring to FIG. 14, in operation 1401, the electronic device may detect the movement thereof. While a display 160 is activated, a processor 120 of the electronic device 101 may acquire movement information of the electronic device by using at least one of a gyro sensor, an acceleration sensor, and a gravity sensor. The processor 120 may detect the movement of the electronic device based on the movement information of the electronic device.

In operation 1403, the electronic device may acquire phase information thereof. In response to the detection of the movement of the electronic device, the processor 120 may acquire phase information of the electronic device by using a gyro sensor, an acceleration sensor, a gravity sensor, and a camera module 291.

In operation 1405, the electronic device may determine whether the electronic device has been rotated based on the phase information of the electronic device. The processor 120 may check an angle by which the electronic device is rotated, based on the phase information of the electronic device and then may determine whether the rotation angle of the electronic device falls within a reference angle range (e.g., 170 to 190 degrees). When the rotation angle of the electronic device falls within the reference angle range, the processor 120 may determine that the electronic device has been rotated. The processor 120 may check an angle by which the electronic device is rotated, based on the phase information of the electronic device. When the rotation angle of the electronic device falls within the reference angle range, the processor 120 may determine whether a user's face has been rotated based on the user's face information (e.g., user's eyes, nose, mouth, chin, etc.) recognized through the camera module 291. When the user's face has been rotated, the processor 120 may determine that the electronic device has been rotated. When the electronic device is not rotated, the processor 120 may again perform operation 1401 of detecting the movement of the electronic device.

When it is determined in operation 1405 that the electronic device has been rotated, in operation 1407, the electronic device may display a soft key corresponding to a hard key of the electronic device. As illustrated in FIG. 15, when the electronic device 1501 is rotated by an angle of 180 degrees with reference to the z-axis, the processor 120 may control the display to display a soft key 1507 corresponding to a volume key 1505 of the electronic device. When the electronic device 1501 is rotated, in order to dispose the soft key 1507 at a location which enables a user to use the soft key 1507 with one hand, the processor 120 may determine whether the user's hand gripping the electronic device 1501 is the user's right or left hand, based on sensing information detected by a pressure sensor of the electronic device 1501. When the user's hand gripping the electronic device 1501 is the right hand, the processor 120 may determine a location at which the soft key 1507 corresponding to the volume key 1505 is to be displayed, in view of the location of the thumb of the right hand and then may control the display to display the soft key 1507 at the determined location.

According to an embodiment of the present disclosure, the processor 120 may perform different functions based on at least one of the type of input performed through a soft key and the level of pressure applied to the soft key. When a tab touch on the soft key 1507 corresponding to the volume key 1505 is detected, the processor 120 may determine that an input for volume adjustment is detected, and may adjust the volume of the electronic device 1501. When a swipe touch 1509 on the soft key 1507 corresponding to the volume key 1505 is detected, the processor 120 may determine that an input corresponding to a lock key 1503 (or a power key) of the electronic device 1501 is detected, and may switch the electronic device 1501 to a lock state. When the display supports an always-on-display (AOD) function, the processor 120 may control the display to continuously display the soft key. Even when, while a soft key corresponding to a hard key is displayed, the hard key is pressed due to the user's gripping, the processor 120 may disregard an input received from the hard key so as to disregard the pressing of the hard key.

Hereinabove, the electronic device is described as determining, in view of the location of a user's thumb, a location at which a soft key is to be displayed. However, according to various embodiments of the present disclosure, the electronic device may determine, in view of the location of a hard key, a location at which a soft key is to be displayed. When the electronic device is rotated, in order to provide a user with a soft key at the same location as that of a hard key, the processor 120 may control the display to display the soft key at a location corresponding to the hard key with reference to the center of the display.

According to various embodiments of the present disclosure, an operating method of an electronic device may include acquiring the phase information of the electronic device while a first application is executed; determining whether the electronic device is rotated based on the phase information; and executing a second application when the electronic device is rotated.

According to various embodiments of the present disclosure, determining whether the electronic device is rotated based on the phase information may include checking a rotation angle of the electronic device based on the phase information; and determining whether the rotation angle of the electronic device falls within a reference angle range.

According to various embodiments of the present disclosure, determining whether the electronic device is rotated based on the phase information may include checking a rotation angle of the electronic device based on the phase information; acquiring user's face information through a camera module of the electronic device when the rotation angle of the electronic device falls within a reference angle range; and determining whether a user's face is in a rotated state, based on the user's face information.

According to various embodiments of the present disclosure, executing the second application may include, when the electronic device is rotated, executing one of an application configured for a rotation direction of the electronic device, an application configured for a rotation angle of the electronic device, an application executed before the first application is executed, an application related to the first application, and an application corresponding to an unidentified notification.

According to various embodiments of the present disclosure, the operating method may further include receiving an input through a camera of the electronic device while the second application is executed; and controlling a function of the electronic device based on the input.

According to various embodiments of the present disclosure, the operating method may further include, when the electronic device in a rotated state receives a call connection request from an external electronic device, displaying information indicating the rotated state of the electronic device.

According to various embodiments of the present disclosure, executing the second application may include displaying, in a multi-window format, a screen corresponding to the first application and a screen corresponding to the second application.

According to various embodiments of the present disclosure, the operating method may further include, when the electronic device is rotated, displaying a soft key corresponding to a physical hard key of the electronic device.

According to various embodiments of the present disclosure, the operating method may further include disregarding an input corresponding to the physical hard key while the soft key is displayed.

According to various embodiments of the present disclosure, executing the second application may include changing an operating mode of the first application from a first mode to a second mode when the electronic device is rotated.

A term "module" used in the present disclosure includes a unit consisting of hardware, software, or firmware, and may be interchangeably used with the terms "a unit", "a logic", "a logical block", "a component", "a circuit", etc. The term "module" may be an integrally constructed component or a minimum unit or one part thereof for performing one or more functions. The "module" may be mechanically or electrically implemented, and may include an application specific integrated circuit (ASIC) chip, field programmable gate arrays (FPGAs), or a programmable-logic device, which is known or is to be developed to perform certain operations. At least one part of an apparatus (e.g., modules or functions thereof) or method (e.g., operations) according to various embodiments of the present disclosure may be implemented with an instruction stored in a non-transitory computer-readable storage media. If the instruction is executed by one or more processors, the one or more processors may perform a function corresponding to the instruction.

The computer-readable storage media may include a hard disk, a floppy disk, magnetic media (e.g., a magnetic tape), optical media (e.g., a compact disc-ROM (CD-ROM), a DVD, magnetic-optic media (e.g., a floptical disk)), an internal memory, etc. The instruction may include a code created by a compiler or a code executable by an interpreter. A module or program module according to various embodiments of the present disclosure may further include one or more of the aforementioned elements, or omit some, or further include another element. Operations carried out by a module, a program module, or another element according to various embodiments may be executed in a sequential, parallel, repeated, or heuristic manner, or at least some operations may be executed in different sequences or may be omitted, or another operation may be added.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure as defined in the appended claims and their equivalents.

What is claimed is:

1. An operating method of an electronic device, the operating method comprising:
   displaying a screen based on a first application, in a first screen orientation;
   while displaying the screen in the first screen orientation, analyzing at least one image that is being obtained through a camera to identify whether an orientation of a visual object in the at least one image corresponding to a face of a user is opposite to the first screen orientation;
   when it is identified based on the analyzed at least one image that the orientation of the visual object is opposite to the first screen orientation, identifying a rotation direction of the electronic device between a clockwise direction and a counterclockwise direction;
   executing a second application corresponding to the rotation direction; and
   in response to executing the second application, displaying another screen based on the second application different from the first application in a second screen orientation that corresponds to the orientation of the visual object.

2. The operating method of claim 1, further comprising:
   displaying information indicating a rotated state of the electronic device, when the electronic device receives a call connection request from an external electronic device while the other screen in the second screen orientation is being displayed.

3. The operating method of claim 1, further comprising:
   displaying a soft key corresponding to a physical hard key of the electronic device, while the other screen in the second screen orientation is being displayed.

4. The operating method of claim 3, further comprising:
   disregarding an input corresponding to the physical hard key while the soft key is displayed.

5. The operating method of claim 1, wherein analyzing the at least one image comprises:
   identifying at least two landmarks within the visual object;
   determining the orientation of the visual object, based on the identification of the at least two landmarks; and
   identifying whether the determined orientation of the visual object is different from the first screen orientation.

6. The operating method of claim 5, wherein the at least two landmarks correspond to eyes, a nose, a mouth, a chin of the face, or a lip of the face.

7. The operating method of claim 1, wherein the at least one image is obtained through the camera when a rotation angle of the electronic device is within a reference angle range.

8. An electronic device comprising:
   a display;
   a camera; and
   a processor configured to:
   display a screen based on a first application, in a first screen orientation by using the display, the first screen orientation being determined by phase information of the electronic device;
   while displaying the screen in the first screen orientation, analyze at least one image that is being obtained through the camera to identify whether an orientation of a visual object in the at least one image corresponding to a face of a user is opposite to the first screen orientation; and when it is identified based on the analyzed at least one image that the orientation of the visual object is opposite to the first screen orientation, identify a rotation direction of the electronic device between a clockwise direction and a counterclockwise direction;

execute a second application corresponding to the rotation direction; and in response to executing the second application, display another screen based on the second application different from the first application in a second screen orientation that corresponds to the orientation of the visual object.

9. The electronic device of claim 8, wherein the processor is further configured to:

display information indicating a rotated state of the electronic device, when the electronic device receives a call connection request from an external electronic device while the other screen in the second screen orientation is being displayed.

10. The electronic device of claim 8, wherein the processor is further configured to:

display a soft key corresponding to a physical hard key of the electronic device, while the other screen in the second screen orientation is being displayed.

11. The electronic device of claim 10, wherein the processor is further configured to:

disregard an input corresponding to the physical hard key while the soft key is displayed.

12. The electronic device of claim 8, wherein the processor is further configured to:

identify at least two landmarks within the visual object;

determine the orientation of the visual object, based on the identification of the at least two landmarks; and identify whether the determined orientation of the visual object is different from the first screen orientation.

13. The electronic device of claim 12, wherein the at least two landmarks correspond to eyes, a nose, a mouth, a chin of the face, or a lip of the face.

14. The electronic device of claim 8, further comprising a sensor module configured to acquire a rotation angle of the electronic device, wherein the processor is further configured to:

obtain the at least one image through the camera when the rotation angle of the electronic device is within a reference angle range.

* * * * *